US012725618B2

(12) United States Patent
Gao

(10) Patent No.: US 12,725,618 B2
(45) Date of Patent: Sep. 1, 2026

(54) STEREO AUDIO SIGNAL PROCESSING METHOD, COMMUNICATION APPARATUS, AND STORAGE MEDIUM

(71) Applicant: Beijing Xiaomi Mobile Software Co., Ltd., Beijing (CN)

(72) Inventor: Shuo Gao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 184 days.

(21) Appl. No.: 18/713,343

(22) PCT Filed: Nov. 26, 2021

(86) PCT No.: PCT/CN2021/133722

§ 371 (c)(1),
(2) Date: May 24, 2024

(87) PCT Pub. No.: WO2023/092505

PCT Pub. Date: Jun. 1, 2023

(65) Prior Publication Data

US 2025/0022474 A1 Jan. 16, 2025

(51) Int. Cl.
*G10L 19/008* (2013.01)
*G06F 3/16* (2006.01)
*G10L 25/06* (2013.01)

(52) U.S. Cl.
CPC ............ *G10L 19/008* (2013.01); *G06F 3/162* (2013.01); *G10L 25/06* (2013.01)

(58) Field of Classification Search
CPC ........ G10L 19/008; G10L 25/06; G06F 3/162
See application file for complete search history.

(56) References Cited

U.S. PATENT DOCUMENTS 10,827,297 B2 11/2020 Liu et al.
11,178,505 B2 11/2021 Liu et al.
(Continued)

FOREIGN PATENT DOCUMENTS

CN 1791285 A 6/2006
CN 101609677 A 12/2009
(Continued)

OTHER PUBLICATIONS

Neural cross-correlation and signal decorrelation: insights into coding of auditory space (Year: 2004).*
(Continued)

*Primary Examiner* — Mohammad K Islam
(74) *Attorney, Agent, or Firm* — Finnegan, Henderson, Farabow, Garrett & Dunner, L.L.P.

(57) ABSTRACT

A stereo audio signal processing method is performed by a coding device, and includes: determining a first cross-correlation coefficient for a left channel signal and a right channel signal of a current frame of a stereo audio signal; and in response to the first cross-correlation coefficient being less than a first threshold, obtaining two decorrelation processed channel signals by using a first decorrelation processing method to decorrelate the current frame of the stereo audio signal, calculating a second cross-correlation coefficient for the two decorrelation processed channel signals, and in response to the first cross-correlation coefficient being less than the second cross-correlation coefficient, determining a flag bit to be a first value, obtaining a coded stream based on the two decorrelation processed channel signals, and writing the flag bit into the coded stream, wherein a value of the first threshold is in a range of (−1, 0).

20 Claims, 10 Drawing Sheets

(56) References Cited

U.S. PATENT DOCUMENTS

| | | | |
|---|---|---|---|
| 2008/0226085 A1 | 9/2008 | Takashima | |
| 2009/0164223 A1 | 6/2009 | Fejzo | |
| 2015/0371646 A1* | 12/2015 | Melkote | G10L 25/09 381/23 |
| 2015/0380000 A1* | 12/2015 | Melkote | G10L 19/02 381/23 |
| 2017/0332185 A1 | 11/2017 | Villemoes et al. | |
| 2020/0045494 A1 | 2/2020 | Liu et al. | |
| 2020/0176001 A1* | 6/2020 | Wang | G10L 19/22 |
| 2021/0014632 A1 | 1/2021 | Liu et al. | |
| 2022/0046376 A1 | 2/2022 | Liu et al. | |

FOREIGN PATENT DOCUMENTS

| | | | | | |
|---|---|---|---|---|---|
| CN | 102368385 | A | | 3/2012 | |
| CN | 109300480 | A | | 2/2019 | |
| CN | 110010140 | A | * | 7/2019 | G10L 19/06 |
| CN | 110495105 | A | | 11/2019 | |
| DE | 102018127071 | B3 | * | 1/2020 | G10L 19/008 |
| EP | 2830053 | A1 | | 1/2015 | |
| EP | 3 664 087 | A1 | | 6/2020 | |
| EP | 3545693 | B1 | * | 6/2020 | H04S 5/00 |
| JP | 6677846 | B2 | * | 4/2020 | G10L 19/167 |
| JP | 2025541122 | A | * | 12/2025 | G10L 19/008 |
| WO | WO 2009/102750 | A1 | | 8/2009 | |
| WO | WO-2014187989 | A2 | * | 11/2014 | H04S 5/00 |
| WO | WO 2017/049396 | A1 | | 3/2017 | |

OTHER PUBLICATIONS

First Office Action issued by The State Intellectual Property Office of the People's Republic of China on Aug. 22, 2024, in corresponding Application No. CN 202180001160.7, 11 pages.

Jia, M., et al., "A Embedded Stereo Speech and Audio Coding Method Meeting the Requirements of ITU-T Terms of Reference", Acta Electronica Sinica, vol. 37, No. 10, Oct. 2009, 7 pages.

ISA State Intellectual Property Office of the People's Republic of China, Written Opinion of the International Searching Authority Issued in Application No. PCT/CN2021/133722, Mar. 10, 2022, WIPO, 7 pages.

European Patent Office, Extended European Search Report Issued in Application No. 21965238.5, Oct. 29, 2024, Germany, 12 pages.

ISA State Intellectual Property Office of the People's Republic of China, International Search Report Issued in Application No. PCT/CN2021/133722, Mar. 10, 2022, WIPO, 4 pages.

* cited by examiner

Figure 1A:
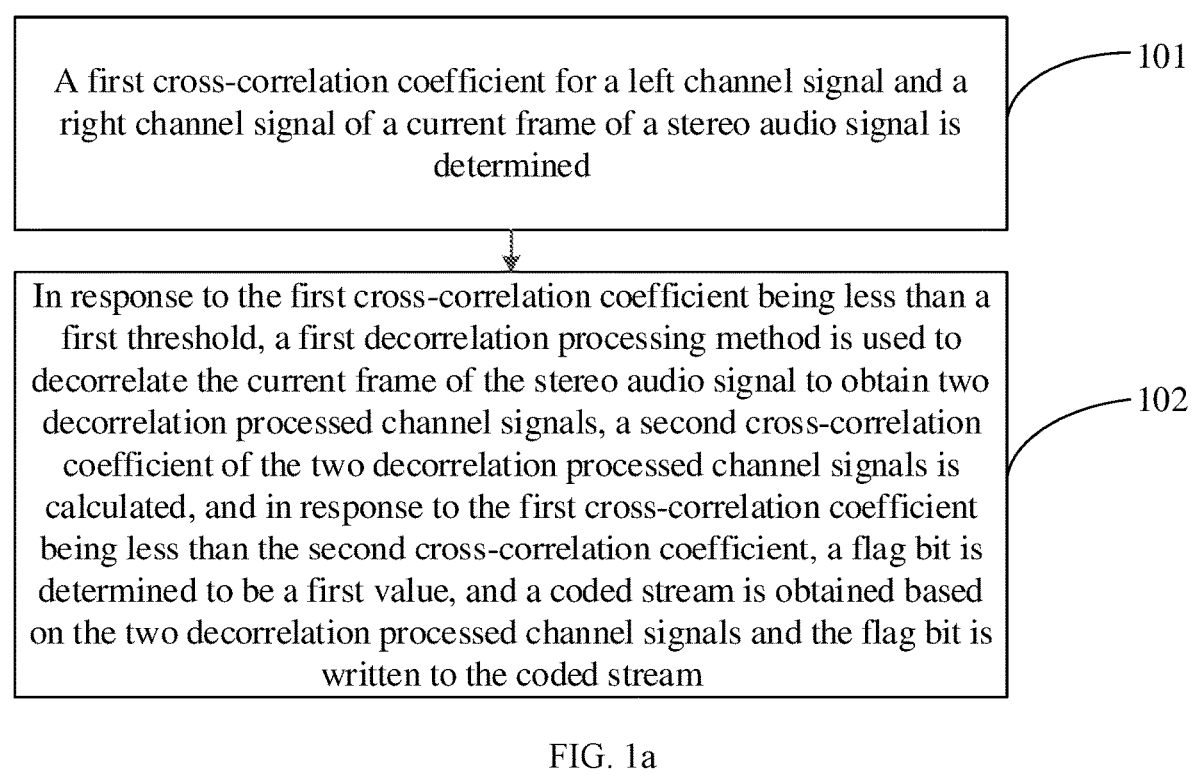

A first cross-correlation coefficient for a left channel signal and a right channel signal of a current frame of a stereo audio signal is determined

101

In response to the first cross-correlation coefficient being less than a first threshold, a first decorrelation processing method is used to decorrelate the current frame of the stereo audio signal to obtain two decorrelation processed channel signals, a second cross-correlation coefficient of the two decorrelation processed channel signals is calculated, and in response to the first cross-correlation coefficient being less than the second cross-correlation coefficient, a flag bit is determined to be a first value, and a coded stream is obtained based on the two decorrelation processed channel signals and the flag bit is written to the coded stream

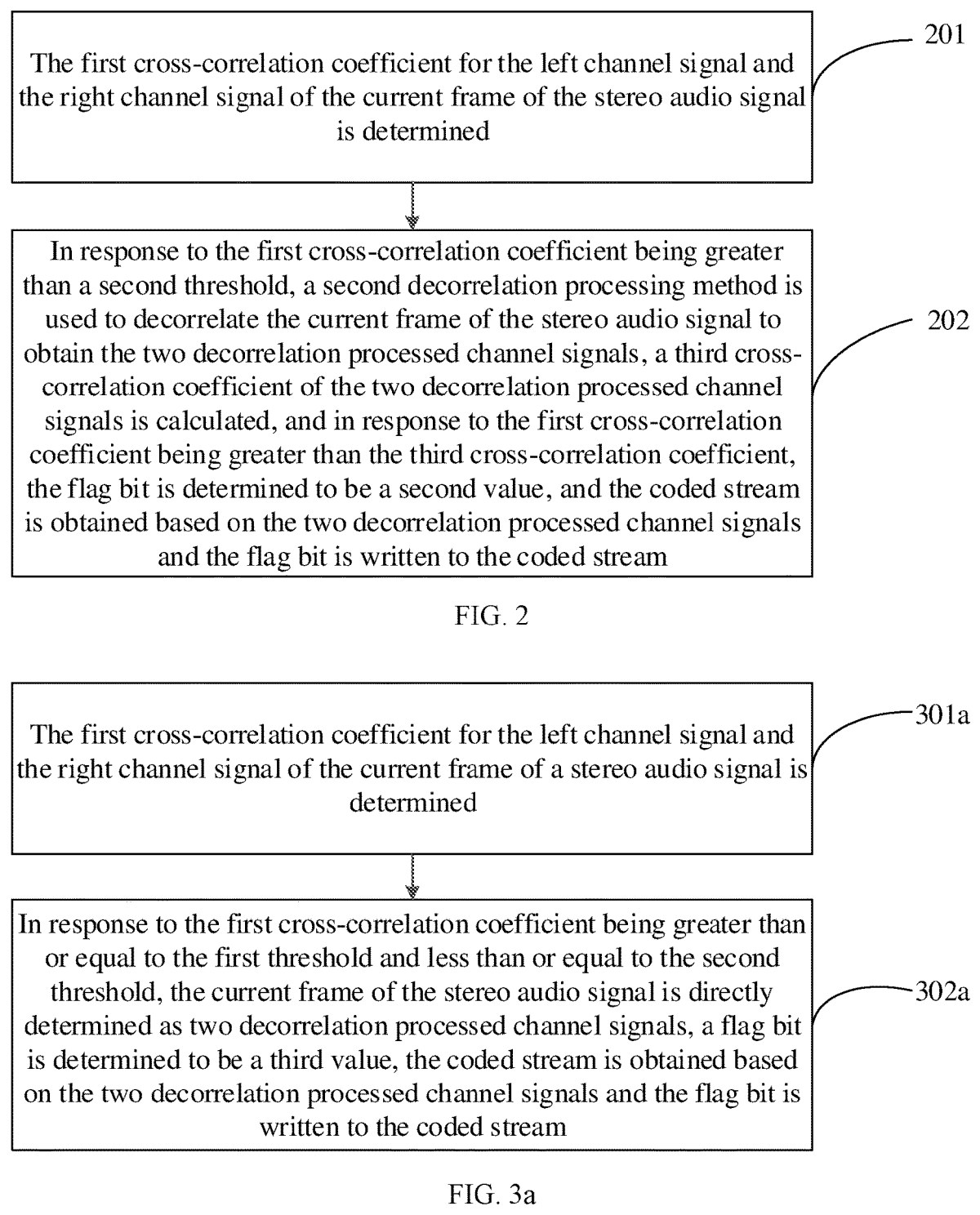

201: The first cross-correlation coefficient for the left channel signal and the right channel signal of the current frame of the stereo audio signal is determined 202: In response to the first cross-correlation coefficient being greater than a second threshold, a second decorrelation processing method is used to decorrelate the current frame of the stereo audio signal to obtain the two decorrelation processed channel signals, a third cross-correlation coefficient of the two decorrelation processed channel signals is calculated, and in response to the first cross-correlation coefficient being greater than the third cross-correlation coefficient, the flag bit is determined to be a second value, and the coded stream is obtained based on the two decorrelation processed channel signals and the flag bit is written to the coded stream

FIG. 2

301a: The first cross-correlation coefficient for the left channel signal and the right channel signal of the current frame of a stereo audio signal is determined 302a: In response to the first cross-correlation coefficient being greater than or equal to the first threshold and less than or equal to the second threshold, the current frame of the stereo audio signal is directly determined as two decorrelation processed channel signals, a flag bit is determined to be a third value, the coded stream is obtained based on the two decorrelation processed channel signals and the flag bit is written to the coded stream

FIG. 3a

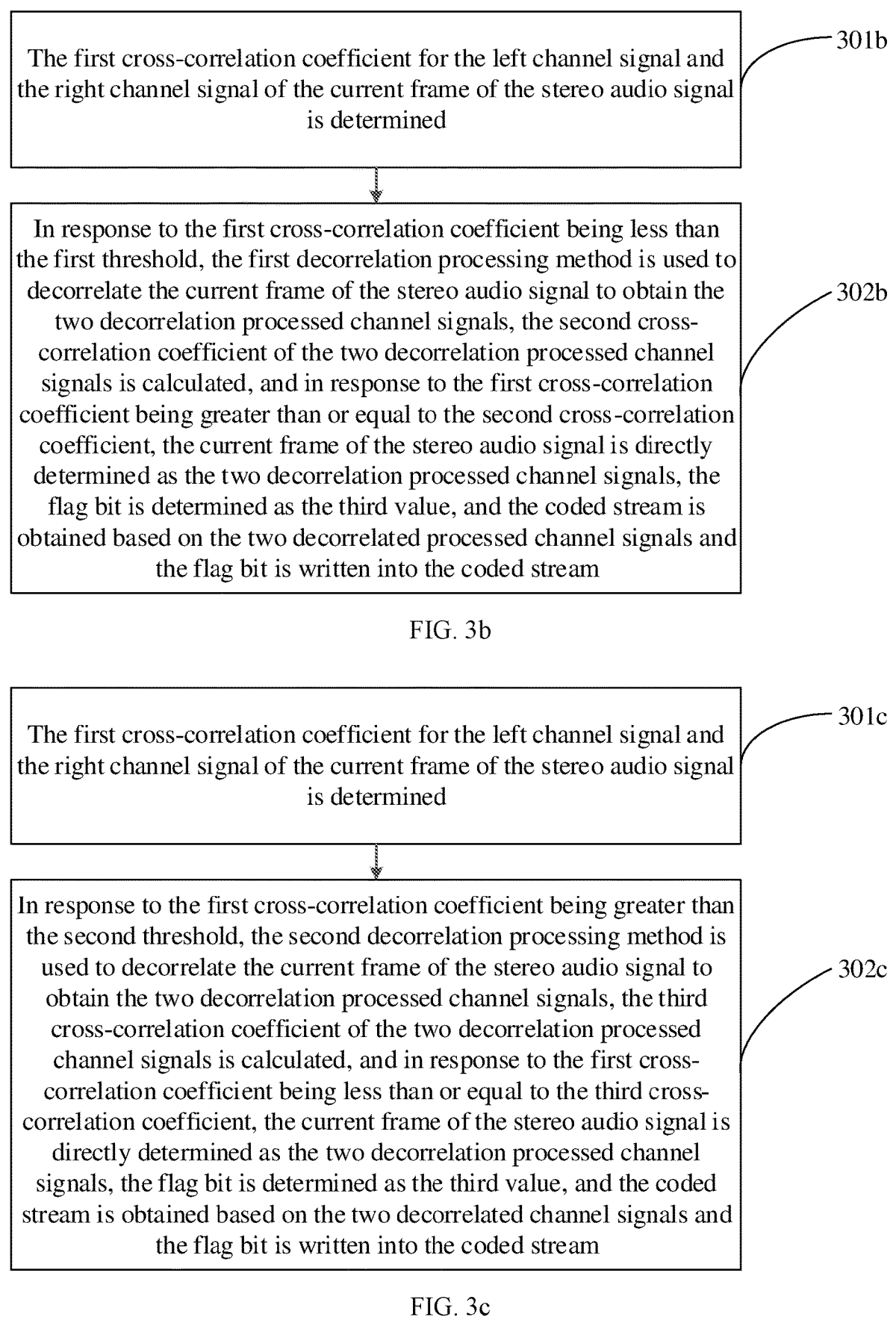

The first cross-correlation coefficient for the left channel signal and the right channel signal of the current frame of the stereo audio signal is determined 301b In response to the first cross-correlation coefficient being less than the first threshold, the first decorrelation processing method is used to decorrelate the current frame of the stereo audio signal to obtain the two decorrelation processed channel signals, the second cross-correlation coefficient of the two decorrelation processed channel signals is calculated, and in response to the first cross-correlation coefficient being greater than or equal to the second cross-correlation coefficient, the current frame of the stereo audio signal is directly determined as the two decorrelation processed channel signals, the flag bit is determined as the third value, and the coded stream is obtained based on the two decorrelated processed channel signals and the flag bit is written into the coded stream 302b

FIG. 3b

The first cross-correlation coefficient for the left channel signal and the right channel signal of the current frame of the stereo audio signal is determined 301c In response to the first cross-correlation coefficient being greater than the second threshold, the second decorrelation processing method is used to decorrelate the current frame of the stereo audio signal to obtain the two decorrelation processed channel signals, the third cross-correlation coefficient of the two decorrelation processed channel signals is calculated, and in response to the first cross-correlation coefficient being less than or equal to the third cross-correlation coefficient, the current frame of the stereo audio signal is directly determined as the two decorrelation processed channel signals, the flag bit is determined as the third value, and the coded stream is obtained based on the two decorrelated channel signals and the flag bit is written into the coded stream 302c

FIG. 3c

A coded stream transmitted by the coding device is obtained

601

Two decorrelation processed channel signals and a flag bit are determined based on the coded stream

602

In response to the flag bit being the third value, the two decorrelation processed channel signals are determined as a reconstructed audio signal directly

603

800

Stereo audio signal processing apparatus

801

Obtaining module

802

Determining module

803

Processing module

STEREO AUDIO SIGNAL PROCESSING METHOD, COMMUNICATION APPARATUS, AND STORAGE MEDIUM

CROSS REFERENCE TO RELATED APPLICATIONS

The present application is a U.S. National Stage of International Application No. PCT/CN2021/133722 filed on Nov. 26, 2021, the content of which is incorporated herein by reference in its entirety.

TECHNICAL FIELD

The present disclosure relates to the field of communication technology, and in particular to stereo audio signal processing methods, communication apparatuses, and storage media.

BACKGROUND

Lossless coding is widely used for meeting the needs of high-quality audio play back and lossless storage. Usually, when lossless coding is performed on stereo audio signals, the stereo audio signals need to be decorrelated first to improve coding compression ratios.

In the related technology, the main way of decorrelation processing is: setting a threshold of which a value ranges between 0 and 1: calculating a correlation coefficient for a left channel signal and a right channel signal of a current frame of a stereo audio signal; and when the correlation coefficient is greater than the threshold, which indicates that the left channel signal and the right channel signal of the current frame are correlated, i.e., the current frame is a correlated signal, decorrelating the left channel signal and the right channel signal of the current frame: or when the correlation coefficient is less than or equal to the threshold, which is considered by a system that the left channel signal and the right channel signal of the current frame are not correlated, processing the stereo audio signal as an decorrelated signal, i.e., directly identifying the current frame of the stereo audio signal as two decorrelation processed channel signals.

In the related technology, when the current frame is a correlated signal, there are two specific correlation forms, i.e., a near in-phase signal and a near out-of-phase signal. In order to achieve the purpose of improving the compression ratio, the ways of decorrelation processing adopted for different correlation forms are not the same. However, in the related technology, the decorrelation processing can only improve the coding compression ratio of the near in-phase signal, but cannot improve the coding compression rate of the near out-of-phase signal.

SUMMARY

An aspect of the present disclosure provides a stereo audio signal processing method, performed by a coding device, including:

determining a first cross-correlation coefficient for a left channel signal and a right channel signal of a current frame of a stereo audio signal:

in response to the first cross-correlation coefficient being less than a first threshold, using a first decorrelation processing method to decorrelate the current frame of the stereo audio signal to obtain two decorrelation processed channel signals, calculating a second cross-correlation coefficient for the two decorrelation processed channel signals, and in response to the first cross-correlation coefficient being less than the second cross-correlation coefficient, determining a flag bit to be a first value, obtaining a coded stream based on the two decorrelation processed channel signals and writing the flag bit into the coded stream, where a value of the first threshold is in a range of (−1, 0).

Another aspect of the present disclosure provides a stereo audio signal processing method, performed by a decoding device, including:

obtaining a coded stream transmitted by a coding device;

determining two decorrelation processed channel signals and a flag bit based on the coded stream; and in response to the flag bit being a first value, obtaining a reconstructed audio signal by reconstructing the two decorrelation processed channel signals using a first decorrelation reconstructing method, and outputting the reconstructed audio signal.

Another aspect of the present disclosure provides a communication apparatus, including a processor and a memory, the memory having a computer program stored therein, the processor executing the computer program stored in the memory to cause the communication device to perform operations including: determining a first cross-correlation coefficient for a left channel signal and a right channel signal of a current frame of a stereo audio signal: in response to the first cross-correlation coefficient being less than a first threshold, obtaining two decorrelation processed channel signals by using a first decorrelation processing method to decorrelate the current frame of the stereo audio signal, calculating a second cross-correlation coefficient for the two decorrelation processed channel signals, and in response to the first cross-correlation coefficient being less than the second cross-correlation coefficient, determining a flag bit to be a first value, obtaining a coded stream based on the two decorrelation processed channel signals, and writing the flag bit into the coded stream, wherein a value of the first threshold is in a range of (−1, 0).

Another aspect of the present disclosure provides a communication device, including a processor and a memory, the memory having a computer program stored therein, the processor executing the computer program stored in the memory to cause the communication device to perform the method as set forth in the above embodiment of the aspect.

Another aspect of the present disclosure provides a communication apparatus, comprising: a processor and an interface circuit:

the interface circuit, for receiving code instructions and transmitting the code instructions to the processor; and the processor, for running the code instructions to perform the above method.

Another aspect of the present disclosure provides a communication apparatus, comprising: a processor and an interface circuit:

the interface circuit, for receiving code instructions and transmitting the code instructions to the processor; and the processor, for running the code instructions to perform the above method.

Another aspect of the present disclosure provides a computer-readable storage medium for storing instructions, in response to the instructions being executed, implementing the method as set forth in the embodiment of the aspect.

Another aspect of the present disclosure provides a computer-readable storage medium for storing instructions, in response to the instructions being executed, to implement the method as set forth in the embodiment of the aspect.

BRIEF DESCRIPTION OF DRAWINGS

The foregoing and/or additional aspects and advantages of the present disclosure will become apparent and readily understood from the following description of embodiments in conjunction with the accompanying drawings, where:

FIG. 1*a* is a schematic flow chart of a stereo audio signal processing method provided by embodiments of the present disclosure:

FIG. 2 is a schematic flow chart of a stereo audio signal processing method provided by embodiments of the present disclosure:

FIG. 3*a* is a schematic flow chart of a stereo audio signal processing method provided by embodiments of the present disclosure:

FIG. 3*b* is a schematic flow chart of a stereo audio signal processing method provided by embodiments of the present disclosure:

FIG. 3*c* is a schematic flow chart of a stereo audio signal processing method provided by embodiments of the present disclosure:

DETAILED DESCRIPTION

Figure 1B:
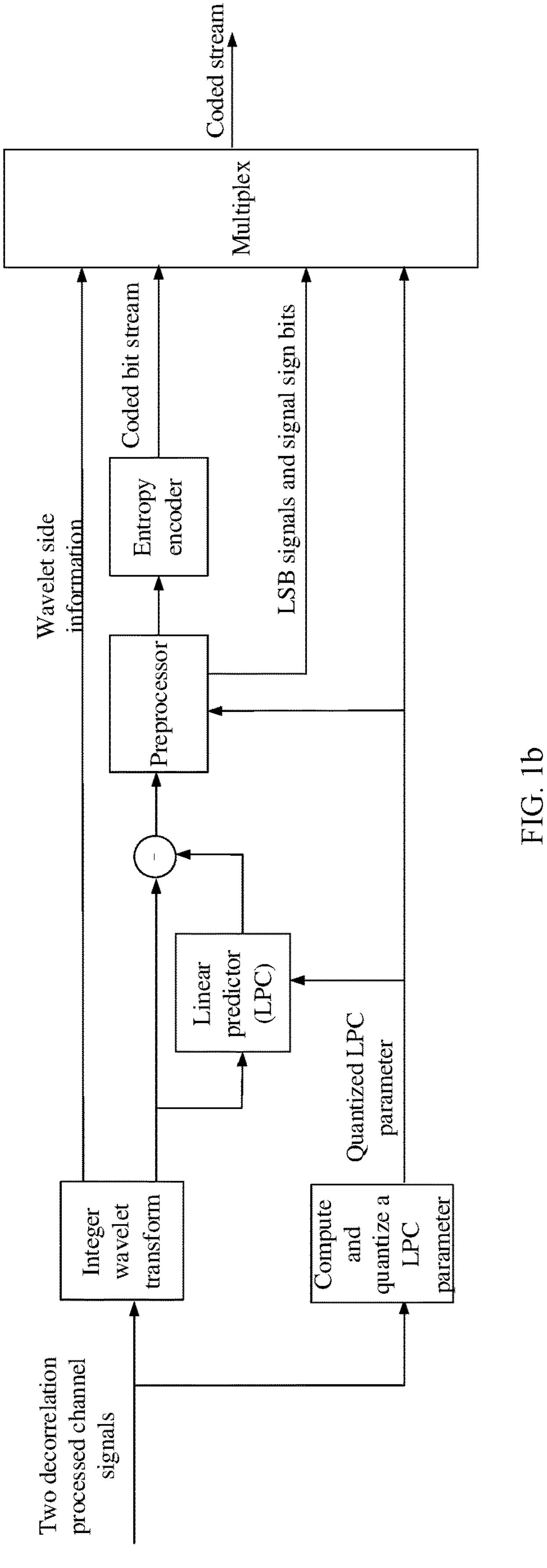
FIG. 1*b* is a block diagram of a process for obtaining a coded stream based on two decorrelation processed channel signals provided by embodiments of the present disclosure.

Embodiments will be described herein in detail, examples of which are represented in the accompanying drawings. When the following descriptions involve the drawings, like numerals in different drawings represent like or similar elements unless stated otherwise. Implementations described in the following examples do not represent all implementations consistent with the embodiments of the present disclosure. Instead, they are merely examples of device and methods consistent with certain aspects of the embodiments of the present disclosure, as detailed in the appended claims.

Terms used in the present disclosure are for the purpose of describing particular examples only and are not intended to limit the embodiments of the present disclosure. As used in the embodiments of the present disclosure and the appended claims, the singular forms "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the embodiments of the present disclosure, first information may be referred as second information; and similarly, second information may also be referred as first information. Depending on the context, the term "if" may be interpreted as "when" or "upon" or "in response to determining".

The stereo audio signal processing methods and apparatuses, coding device, decoding device, and storage medium provided in embodiments of the present disclosure are described in detail below with reference to the accompanying drawings.

FIG. 1*a* is a schematic flow chart of a stereo audio signal processing method provided by embodiments of the present disclosure, the method being performed by a coding device. As shown in FIG. 1*a*, the stereo audio signal processing method includes the following steps.

Step 101: a first cross-correlation coefficient for a left channel signal and a right channel signal of a current frame of a stereo audio signal is determined.

In one embodiment of the present disclosure, in response to receiving the input stereo audio signal by the coding device, the current frame of the stereo audio signal may be analyzed for cross-correlation to obtain the first cross-correlation coefficient for the left channel signal and the right channel signal of the current frame.

Also, in an embodiment of the present disclosure, the method of determining the first cross-correlation coefficient for the left channel signal and the right channel signal of the current frame of the stereo audio signal may include:

determining the first cross-correlation coefficient for the left channel signal and the right channel signal based on a formula III, where the formula III is:

$$\begin{cases} \eta_{(LR)} = \dfrac{\sum_{n=1}^{N}\left(L(n)-\overline{L}\right)\times\left(R(n)-\overline{R}\right)}{\sqrt{\sum_{n=1}^{N}\left(L(n)-\overline{L}\right)^2}\times\sqrt{\sum_{n=1}^{N}\left(R(n)-\overline{R}\right)^2}} \\ \overline{L} = \dfrac{\sum_{n=1}^{N} L(n)}{N} \\ \overline{R} = \dfrac{\sum_{n=1}^{N} R(n)}{N} \end{cases}$$

where the $\eta_{(LR)}$ is the cross-correlation coefficient for the left channel signal and the right channel signal of the current frame, the L(n) is a $n^{th}$ sample point of the left channel signal of the current frame, the $\overline{L}$ is an average of all sample points of the left channel signal of the current frame, the R(n) is a $n^{th}$ sample point of the right channel signal of the current frame, the $\overline{R}$ is an average of all sample points of the right channel signal of the current frame, and the N is a total number of sample points of the left channel signal or the right channel signal of the current frame, i.e., a length of the current frame.

Step 102: in response to the first cross-correlation coefficient being less than a first threshold, a first decorrelation processing method is used to decorrelate the current frame of the stereo audio signal to obtain two decorrelation processed channel signals, a second cross-correlation coefficient for the two decorrelation processed channel signals is calculated, and in response to the first cross-correlation coefficient being less than the second cross-correlation coefficient, a flag bit is determined to be a first value, and a coded stream is obtained based on the two decorrelation processed channel signals and the flag bit is written to the coded stream.

In an embodiment of the present disclosure, the first threshold may be predetermined, and a value of the first threshold is in the range of (−1, 0). In an embodiment of the present disclosure, the value of the first threshold may be within [−0.5, −0.1]. In an embodiment of the present disclosure, the value of the first threshold may be −0.3.

Also, in an embodiment of the present disclosure, in response to the first cross-correlation coefficient being less than the first threshold, it is indicated that the left channel signal and the right channel signal of the current frame are negatively correlated therebetween, i.e., the current frame is a near out-of-phase signal. At this time, the first decorrelation processing method may be used to decorrelate the current frame of the stereo audio signal to obtain the two decorrelation processed channel signals. In an embodiment of the present disclosure, the first decorrelation processing method may be a first Mid/Side down-mixing processing. In an example, the first Mid/Side down-mixing processing may include: processing the left channel signal and the right channel signal to obtain a primary channel signal and a secondary channel signal based on a formula I, where the formula I is:

$$\begin{cases} Mid(n) = \dfrac{(L(n) - R(n))}{2} \\ Sid(n) = L(n) + R(n) \end{cases}$$

where the Mid(n) is the primary channel signal in the two decorrelation processed channel signals, the Sid(n) is the secondary channel signal in the two decorrelation processed channel signals, the L(n) is the left channel signal, and the R(n) is the right channel signal.

As can be seen, embodiments of the present disclosure may determine whether the current frame of the stereo audio signal is a near out-of-phase signal, and, in response to determining that the current frame of the stereo audio signal is a near out-of-phase signal, a first decorrelation processing method is used corresponding to the near out-of-phase signal to decorrelate the current frame of the stereo audio signal so as to obtain two decorrelation processed channel signals, thereby greatly improving the coding compression ratio of the near out-of-phase signal.

Further, it should be noted that, in the communication system, there may exist a situation in which the cross-correlation of the two-channel signal obtained after the audio signal is decorrelated is greater than or equal to the cross-correlation of the two channels of the audio signal before the decorrelation process, that is, the decorrelation process does not achieve the purpose of decorrelation. Thus, in an embodiment of the present disclosure, after obtaining the two decorrelation processed channel signals by performing the first decorrelation process on the current frame, a second cross-correlation coefficient for the two decorrelation processed channel signals may be further calculated, and a magnitude relationship between the second cross-correlation coefficient (i.e., after the decorrelation process) and the first cross-correlation coefficient (i.e., before the decorrelation process) may be determined to determine whether the first decorrelation process achieves the purpose of decorrelation.

In an embodiment of the present disclosure, the method of calculating the second cross-correlation coefficient for the two decorrelation processed channel signals may include:

determining the second cross-correlation coefficient based on formula IV, where the formula IV is:

$$\begin{cases} \eta_{(MS)} = \dfrac{\sum_{n=1}^{N} \left(Mid(n) - \overline{Mid}\right) \times \left(Sid(n) - \overline{Sid}\right)}{\sqrt{\sum_{n=1}^{N} \left(Mid(n) - \overline{Mid}\right)^2} \times \sqrt{\sum_{n=1}^{N} \left(Sid(n) - \overline{Sid}\right)^2}} \\ \overline{Mid} = \dfrac{\sum_{n=1}^{N} Mid(n)}{N} \\ \overline{Sid} = \dfrac{\sum_{n=1}^{N} Sid(n)}{N} \end{cases}$$

where the $\eta_{(MS)}$ is the second cross-correlation coefficient, the Mid(n) is a $n^{th}$ sample point of the primary channel signal of the two decorrelation processed channel signals, the $\overline{Mid}$ is an average of all sample points of the primary channel signal of the two decorrelation processed channel signals, the Sid(n) is a $n^{th}$ sample point of the secondary channel signal of the two decorrelation processed channel signals, the $\overline{Sid}$ is an average of all sample points of the secondary channel signal of the two decorrelation processed channel signals, and the N is a total number of sample points of the left channel signal or the right channel signal of the current frame, i.e., a length of the current frame.

Also, in an embodiment of the present disclosure, in response to the first cross-correlation coefficient being less than the second cross-correlation coefficient, it is determined that the first decorrelation processing method achieves the purpose of decorrelation.

In an example, it should be recognized that the magnitude of the cross-correlation between signals is positively related with an absolute value of the cross-correlation coefficient. And, for a near out-of-phase signal with a negative cross-correlation coefficient, the lower the value of the cross-correlation coefficient and the higher the absolute value of the cross-correlation coefficient, the better the negative cross-correlation.

Based on this, in an embodiment of the present disclosure, since the current frame of the stereo audio signal is the near out-of-phase signal, if the first cross-correlation coefficient is less than the second cross-correlation coefficient, it is indicated that the negative cross-correlation of the two channels of the audio signal before performing the first decorrelation processing method is higher than the negative cross-correlation of the two-channel signal obtained after performing the first decorrelation processing method. And thus, it can be determined that the first decorrelation processing method achieves the purpose of decorrelation.

Also, in an embodiment of the present disclosure, in response to determining that the first decorrelation processing method achieves the purpose of decorrelation, the coded stream may be obtained based on the two decorrelation processed channel signals. In an embodiment of the present disclosure, FIG. 1*b* is a block diagram of a process for obtaining the coded stream based on the two decorrelation processed channel signals provided by embodiments of the present disclosure. As shown in FIG. 1*b*, a method of obtaining the coded stream based on the two decorrelation processed channel signals may be as follows.

The two decorrelation processed channel signals are divided into subbands by using integer wavelet transform to obtain subband signals. Linear prediction coefficient (LPC) parameters of the two decorrelation processed channel signals are computed and quantized to obtain quantized LPC parameters. And each of the subband signals is predicted based on the quantized LPC parameters by using a linear predictor to generate a predicted residual signal respectively. The predicted residual signal is normalized by using a preprocessor to generate a normalized output signal, a least significant bit (LSB) signal and a signal sign bit. The normalized output signals corresponding to the subband signals are entropy encoded by using an entropy encoder to generate a coded bit stream. And then the coded bit stream, the LSB signals, the signal sign bits, the quantized LPC parameters and wavelet side information are multiplexed to obtain the coded stream.

Further, in an embodiment of the present disclosure, in response to obtaining the coded stream, the flag bit may be determined to be the first value (e.g., may be 0) which may be used to indicate that decorrelation processing is performed by the coding device according to the first decorrelation processing method. And the flag bit may be written into the coded stream to be transmitted to the decoding device, so that the decoding device may adopt a corresponding decorrelation reconstructing method to perform reconstruction based on the flag bit.

Furthermore, it is to be noted that in an embodiment of the present disclosure, the first thresholds corresponding to different frames of the stereo audio signal respectively may be different. In response to the first thresholds corresponding to the different frames respectively being different, in an example, the first cross-correlation coefficient for the left channel signal and the right channel signal of the current frame is compared with the first threshold corresponding to the current frame.

It should also be noted that the above contents of the present embodiment describe processing the stereo audio signal based on the cross-correlation between the left channel signal and the right channel signal of the current frame of the stereo audio signal. In another embodiment of the present disclosure, the stereo audio signal may also be processed based on a phase difference between the left channel signal and the right channel signal of the current frame of the stereo audio signal. In an example, a first phase difference between the left channel signal and the right channel signal of the current frame may be firstly determined. If the first phase difference between the left channel signal and the right channel signal of the current frame lies in a first interval, the stereo audio signal is determined as the near out-of-phase signal, the current frame of the stereo audio signal is decorrelated by using the first decorrelation processing method to obtain the two decorrelation processed channel signals, and a second phase difference between the two decorrelation processed channel signals is calculated. In response to the first phase difference being greater than the second phase difference, it is indicated that the first decorrelation processing method achieves the purpose of decorrelation. The flag bit is determined to be the first value, the coded stream is obtained based on the two decorrelation processed channel signals, and the flag bit is written into the coded stream to be transmitted to the decoding device. The first interval may be [135°, 180°].

In summary, in the stereo audio signal processing method provided in embodiments of the present disclosure, the first cross-correlation coefficient for the left channel signal and the right channel signal of the current frame of the stereo audio signal is firstly determined. In response to the first cross-correlation coefficient being less than the first threshold, the first decorrelation processing method is used to perform decorrelation processing on the current frame of the stereo audio signal in order to obtain the two decorrelation processed channel signals. And thereafter, a second cross-correlation coefficient for the two decorrelation processed channel signals is calculated. In response to the first cross-correlation coefficient being less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the coding compression ratio of the near out-of-phase signal.

FIG. 2 is a flow chart of a stereo audio signal processing method provided by embodiments of the present disclosure which is performed by the coding device. As shown in FIG. 2, the stereo audio signal processing method includes the following steps.

Step 201: the first cross-correlation coefficient for the left channel signal and the right channel signal of the current frame of the stereo audio signal is determined.

A related description of step 201 can be found in the description of the above embodiments, and the embodiments of the present disclosure will not repeat the related description herein.

Step 202: in response to the first cross-correlation coefficient being greater than a second threshold, a second decorrelation processing method is used to decorrelate the current frame of the stereo audio signal to obtain the two decorrelation processed channel signals, a third cross-correlation coefficient for the two decorrelation processed channel signals is calculated, and in response to the first cross-correlation coefficient being greater than the third cross-correlation coefficient, the flag bit is determined to be a second value, and the coded stream is obtained based on the two decorrelation processed channel signals and the flag bit is written to the coded stream.

In an embodiment of the present disclosure, the second threshold may be predetermined, and a value of the second threshold may be in a range of (0, 1). In an embodiment of the present disclosure, the value of the second threshold may be between [0.1, 0.5]. In an embodiment of the present disclosure, the value of the second threshold may be 0.3.

Also, in an embodiment of the present disclosure, in response to the second cross-correlation coefficient being greater than the first threshold, it is indicated that the left channel signal and the right channel signal of the current frame are positively correlated therebetween, i.e., the current frame is a near in-phase signal. At this time, the second decorrelation processing method may be used to decorrelate the current frame of the stereo audio signal to obtain the two decorrelation processed channel signals. In an embodiment of the present disclosure, the second decorrelation processing method may be a second Mid/Side down-mixing processing. In an example, the second Mid/Side down-mixing processing may include: processing the left channel signal and the right channel signal to obtain a primary channel signal and a secondary channel signal based on a formula II, where the formula II is:

$$\begin{cases} Mid(n) = \frac{(L(n) + R(n))}{2} \\ Sid(n) = L(n) - R(n) \end{cases}$$

where the Mid(n) is the primary channel signal of the two decorrelation processed channel signals, the Sid(n) is the secondary channel signal of the two decorrelation processed channel signals, the L(n) is the left channel signal, and the R(n) is the right channel signal.

As can be seen, embodiments of the present disclosure may determine whether the current frame of the stereo audio signal is the near in-phase signal, and, in response to determining that the current frame of the stereo audio signal is the near in-phase signal, the second decorrelation processing method corresponding to the near in-phase signal is used to decorrelate the current frame of the stereo audio signal so as to obtain the two decorrelation processed channel signals, thereby greatly improving the coding compression ratio of the near in-phase signal.

Further, it should be noted that, in the communication system, there may exist a situation in which the correlation of the two-channel signal obtained after the audio signal is decorrelated is greater than or equal to the correlation of the two channels of the audio signal before the decorrelation process, that is, the decorrelation process does not achieve the purpose of decorrelation. Thus, in an embodiment of the present disclosure, after obtaining the two decorrelation processed channel signals by performing the second decorrelation process on the current frame, a third cross-correlation coefficient for the two decorrelation processed channel signals may be further calculated, and a magnitude relationship between the third cross-correlation coefficient (i.e., after the decorrelation process) and the first cross-correlation coefficient (i.e., before the decorrelation process) may be determined to determine whether the second decorrelation process achieves the purpose of decorrelation.

In an embodiment of the present disclosure, a method of calculating the third cross-correlation coefficient for the two decorrelation processed channel signals may include:

determining the third cross-correlation coefficient based on a formula IV, where the formula IV is:

$$\begin{cases} \eta_{(MS)} = \frac{\sum_{n=1}^{N}\left(Mid(n) - \overline{M_1 d}\right) \times \left(Sid(n) - \overline{S_1 d}\right)}{\sqrt{\sum_{n=1}^{N}\left(Mid(n) - \overline{M_1 d}\right)^2} \times \sqrt{\sum_{n=1}^{N}\left(Sid(n) - \overline{S_1 d}\right)^2}} \\ \overline{M_1 d} = \frac{\sum_{n=1}^{N} Mid(n)}{N} \\ \overline{S_1 d} = \frac{\sum_{n=1}^{N} S_1 d(n)}{N} \end{cases}$$

where the $\eta_{(MS)}$ is the third cross-correlation coefficient, the Mid(n) is a $n^{th}$ sample point of the primary channel signal of the two decorrelation processed channel signals, the $\overline{\text{Mid}}$ is an average of all sample points of the primary channel signal of the two decorrelation processed channel signals, the Sid(n) is a $n^{th}$ sample point of the secondary channel signal of the two decorrelation processed channel signals, the $\overline{\text{Sid}}$ is an average of all sample points of the secondary channel signal of the two decorrelation processed channel signals, the N is a total number of sample points of the left channel signal or the right channel signal of the current frame, i.e., a length of the current frame.

Also, in an embodiment of the present disclosure, in response to the first cross-correlation coefficient being greater than the third cross-correlation coefficient, it is determined that the second decorrelation processing method achieves the purpose of decorrelation.

In an example, it should be recognized that magnitude of correlation between signals is positively related with an absolute value of the correlation coefficient. And, for a near in-phase signal with a positive correlation coefficient, the lower the value of the cross-correlation coefficient and the smaller the absolute value of the cross-correlation coefficient, the worse the positive correlation.

Based on this, since the current frame of the stereo audio signal is the near in-phase signal, if the first cross-correlation coefficient is greater than the third cross-correlation coefficient, it is indicated that the positive correlation of the two channels of the audio signal before performing the second decorrelation process method is higher than the positive correlation of the two-channel signal after performing the second decorrelation process method. And thus, it can be determined that the second decorrelation process method achieves the purpose of decorrelation.

Also, in an embodiment of the present disclosure, in response to determining that the second decorrelation processing method achieves the purpose of decorrelation, the coded stream may be obtained based on the two decorrelation processed channel signals, and the flag bit may be determined to be the second value (e.g., 1) which may be used to indicate that the decorrelation process performed by the coding device adopts the second decorrelation processing method. And the flag bit may be written into the coded stream and transmitted to the decoding device, so that the decoding device may adopt a corresponding decorrelation reconstructing method based on the flag bit to perform reconstructing.

The specific method of obtaining the coded stream based on the two decorrelation processed channel signals described above can be referred to the preceding embodiments, and the embodiments of the present disclosure will not repeat the specific method herein.

Furthermore, it is to be noted that in an embodiment of the present disclosure, the second thresholds corresponding to different frames of the stereo audio signal respectively may be different. In response to the second thresholds corresponding to the different frames respectively being different, the first cross-correlation coefficient for the left channel signal and the right channel signal of the current frame may be compared with the second threshold corresponding to the current frame.

It should also be noted that the above contents of the present embodiment describe processing the stereo audio signal based on the cross-correlation between the left channel signal and the right channel signal of the current frame of the stereo audio signal. In another embodiment of the present disclosure, the stereo audio signal may also be processed based on a phase difference between the left channel signal and the right channel signal of the current frame of the stereo audio signal. In an example, the first phase difference between the left channel signal and the right channel signal of the current frame may be firstly determined. If the first phase difference between the left channel signal and the right channel signal of the current frame lies in a second interval, the current frame of the stereo audio signal is determined to be the near in-phase signal, the current frame of the stereo audio signal is decorrelated by using a second decorrelation processing method to obtain the two decorrelation processed channel signals, and a third phase difference between the two decorrelation processed channel signals is calculated. In response to the first phase difference being greater than the third phase difference, it is indicated that the second decorrelation processing method achieves the purpose of decorrelation. The flag bit is determined to be the second value, a coded stream is obtained based on the two decorrelation processed channel signals, and the flag bit is written into the coded stream to be transmitted to the decoding device. The second interval may be [0°, 45°].

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal to obtain the two decorrelation processed channel signals. And thereafter, the second cross-correlation coefficient for the two decorrelation processed channel signals is calculated. When the first cross-correlation coefficient is less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the coding compression ratio of the near out-of-phase signal.

FIG. 3*a* is a schematic flow chart of a stereo audio signal processing method provided by embodiments of the present disclosure which is performed by the coding device. As shown in FIG. 3*a*, the stereo audio signal processing method may include the following steps.

Step 301*a*, the first cross-correlation coefficient for the left channel signal and the right channel signal of the current frame of a stereo audio signal is determined.

A related description of step 301*a* can be found in the description of the above embodiments, and the embodiments of the present disclosure will not repeat the related description herein.

Step 302*a*, in response to the first cross-correlation coefficient being greater than or equal to the first threshold and less than or equal to the second threshold, the current frame of the stereo audio signal is directly determined as two decorrelation processed channel signals, a flag bit is determined to be a third value, the coded stream is obtained based on the two decorrelation processed channel signals and the flag bit is written to the coded stream.

In an embodiment of the present disclosure, the first threshold may be predetermined, and the value of the first threshold may be in the range of (−1, 0). In an embodiment of the present disclosure, the value of the first threshold may be between [−0.5, −0.1]. In an embodiment of the present disclosure, the value of the first threshold may be −0.3. And, in an embodiment of the present disclosure, the second threshold may be predetermined, and a value of the second threshold may be in a range of (0, 1). In embodiment of the present disclosure, the value of the second threshold may be between [0.1, 0.5]. In an embodiment of the present disclosure, the value of the second threshold may be 0.3.

Further, in an embodiment of the present disclosure, when the first cross-correlation coefficient is greater than or equal to the first threshold and less than or equal to the second threshold, it is indicated that the left channel signal and the right channel signal of the current frame are not correlated. At this time there is no need to perform a decorrelation process on the current frame of the stereo audio signal, and the current frame of the stereo audio signal can be directly determined as two decorrelation processed channel signals. The coded stream is obtained based on the two decorrelation processed channel signals. The flag bit is determined to be a third value (e.g., 2) which may be used to indicate that the decorrelation processing has not been used by the coding device, and may be written into the coded stream to be transmitted to a decoding device, so that the decoding device may perform corresponding reconstructing based on the flag bit.

A specific method of obtaining the coded stream based on the two decorrelation processed channel signals described above can be referred to in the preceding embodiments, and the embodiments of the present disclosure will not repeat the specific method herein.

It should also be noted that the above contents of the present embodiment describe processing the stereo audio signal based on the cross-correlation between the left channel signal and the right channel signal of the current frame of the stereo audio signal. In another embodiment of the present disclosure, the stereo audio signal may also be processed based on a phase difference between the left channel signal and the right channel signal of the current frame of the stereo audio signal. In an example, the first phase difference between the left channel signal and the right channel signal of the current frame may be firstly determined. If the first phase difference between the left channel signal and the right channel signal of the current frame lies in a third interval, the current frame of the stereo audio signal is determined as an uncorrelated signal, the current frame of the stereo audio signal is directly determined as the two decorrelation processed channel signals, the flag bit is determined as the third value, the coded stream is obtained based on the two decorrelation processed channel signals and the flag bit is written to the coded stream to be transmitted to the decoding device. The third interval may be (45°, 135°).

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal in order to obtain the two decorrelation processed channel signals. And thereafter, a second cross-correlation coefficient for the two decorrelation processed channel signals is calculated. In response to the first cross-correlation coefficient being less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the coding compression ratio of the near out-of-phase signal.

FIG. 3*b* is a schematic flow chart of a stereo audio signal processing method provided by embodiments of the present disclosure which is performed by the coding device. As shown in FIG. 3*b*, the stereo audio signal processing method includes the following steps.

Step 301*b*, the first cross-correlation coefficient for the left channel signal and the right channel signal of the current frame of the stereo audio signal is determined.

A related description of step 301*b* can be found in the description of the above embodiments, and the embodiments of the present disclosure will not repeat the related description herein.

Step 302*b*, in response to the first cross-correlation coefficient being less than the first threshold, the first decorrelation processing method is used to decorrelate the current frame of the stereo audio signal to obtain the two decorrelation processed channel signals, the second cross-correlation coefficient for the two decorrelation processed channel signals is calculated, and in response to the first cross-correlation coefficient being greater than or equal to the second cross-correlation coefficient, the current frame of the stereo audio signal is directly determined as the two decorrelation processed channel signals, the flag bit is determined as the third value, and the coded stream is obtained based on the two decorrelation processed channel signals and the flag bit is written into the coded stream.

A related detailed description of the first threshold, the first decorrelation processing method, the first cross-correlation coefficient and the second cross-correlation coefficient can be referred to the above-described embodiments, and the embodiments of the present disclosure will not repeat the related detailed description herein.

Also, in an embodiment of the present disclosure, in response to the first cross-correlation coefficient being less than the first threshold and greater than or equal to the second cross-correlation coefficient, it is determined that the first decorrelation processing method does not achieve the purpose of decorrelation.

In an example, with reference to the foregoing, it can be seen that in response to the first cross-correlation coefficient being less than the first threshold, it is indicated that the current frame of the stereo audio signal is the near out-of-phase signal (i.e., the smaller the correlation coefficient is, the higher the negative correlation is). If the first cross-correlation coefficient (i.e., the cross-correlation coefficient before the decorrelation processing) is greater than or equal to the second cross-correlation coefficient (i.e., the cross-correlation coefficient after the decorrelation processing), it is indicated that the negative correlation of the two channels of the audio signal before the first decorrelation processing is lower than the negative correlation of the two-channel signal after the first decorrelation processing. Thus, it can be determined that the first decorrelation processing method does not achieve the purpose of decorrelation.

Based on this, in an embodiment of the present disclosure, in response to determining that the first decorrelation processing method does not achieve the purpose of decorrelation, the coding compression ratio will be greatly reduced if coding is continued based on the decorrelated processed two-channel signal obtained by the first decorrelation processing method. Therefore, in the present disclosure, the current frame of the stereo audio signal can be directly determined as the two decorrelation processed channel signals, the flag bit can be determined to be the third value (e.g., 2), the coded stream can be obtained based on the two decorrelation processed channel signals, and the flag bit can be written into the coded stream to be transmitted to the decoding device, so as to ensure the subsequent coding compression ratio. A related description of this part can be referred to the preceding embodiments, and the embodiments of the present disclosure will not repeat the related description herein.

It should also be noted that the above contents of the present embodiment describe processing the stereo audio signal based on the cross-correlation between the left channel signal and the right channel signal of the current frame of the stereo audio signal. In another embodiment of the present disclosure, the stereo audio signal may also be processed based on the phase difference between the left channel signal and the right channel signal of the current frame of the stereo audio signal. In an example, the first phase difference between the left channel signal and the right channel signal of the current frame may be firstly determined. If the first phase difference between the left channel signal and the right channel signal of the current frame lies in the first interval, the current frame of the stereo audio signal is determined as the near out-of-phase signal, the current frame of the stereo audio signal is decorrelated by using the first decorrelation processing method to obtain the two decorrelation processed channel signals, and the second phase difference between the two decorrelation processed channel signals is calculated. In response to the first phase difference being less than or equal to the second phase difference, it is indicated that the first decorrelation processing method does not achieve the purpose of decorrelation. Then the current frame of the stereo audio signal is directly determined as the two decorrelation processed channel signals, the flag bit is determined to be the third value, the coded stream is obtained based on the two decorrelation processed channel signals, and the flag bit is written into the coded stream to be transmitted to the decoding device. The first interval may be [135, 180].

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal in order to obtain the two decorrelation processed channel signals. And thereafter, the second cross-correlation coefficient for the two decorrelation processed channel signals is calculated. In response to the first cross-correlation coefficient being less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide the way of determining the near out-of-phase signal and the corresponding decorrelation processing method, which greatly improves the coding compression ratio of the near out-of-phase signal.

FIG. 3c is a flow chart of a stereo audio signal processing method provided by embodiments of the present disclosure which is performed by the coding device. As shown in FIG. 3c, the stereo audio signal processing method includes the following steps.

Step 301c, the first cross-correlation coefficient for the left channel signal and the right channel signal of the current frame of the stereo audio signal is determined.

A related description of step 301c can be found in the description of above the embodiments, and the embodiments of the present disclosure will not repeat the related description herein.

Step 302c, in response to the first cross-correlation coefficient being greater than the second threshold, the second decorrelation processing method is used to decorrelate the current frame of the stereo audio signal to obtain the two decorrelation processed channel signals, the third cross-correlation coefficient for the two decorrelation processed channel signals is calculated, and in response to the first cross-correlation coefficient being less than or equal to the third cross-correlation coefficient, the current frame of the stereo audio signal is directly determined as the two decorrelation processed channel signals, the flag bit is determined as the third value, and the coded stream is obtained based on the two decorrelation processed channel signals and the flag bit is written into the coded stream.

A related detailed description of the second threshold, the second decorrelation processing method, the first cross-correlation coefficient and the third cross-correlation coefficient can be referred to the above-described embodiments, and the embodiments of the present disclosure will not repeat the related detailed description herein.

Also, in an embodiment of the present disclosure, in response to the first cross-correlation coefficient being greater than the second threshold and less than or equal to the third cross-correlation coefficient, it is determined that the second decorrelation processing method does not achieve the purpose of decorrelation.

In an example, with reference to the foregoing, it can be seen that in response to the first cross-correlation coefficient being greater than the second threshold, it is indicated that the current frame of the stereo audio signal is the near in-phase signal (i.e., the greater the correlation coefficient, the higher the positive correlation). If the first cross-correlation coefficient (i.e., the cross-correlation coefficient before the decorrelation processing) is less than or equal to the third cross-correlation coefficient (i.e., the cross-correlation coefficient after the decorrelation processing), it is indicated that the positive correlation of the two channels of the audio signal before the second decorrelation processing is lower than or equal to the positive correlation of the two-channel signal after the second decorrelation processing. Thus, it can be determined that the second decorrelation processing method does not achieve the purpose of decorrelation.

Based on this, in an embodiment of the present disclosure, in response to determining that the second decorrelation processing method does not achieve the purpose of decorrelation, the coding compression ratio will be greatly reduced if coding is continued based on the decorrelated processed two-channel signal obtained by the second decorrelation processing method. Therefore, in the present disclosure, the current frame of the stereo audio signal can be directly determined as the two decorrelation processed channel signals, the flag bit can be determined to be the third value (e.g., 2), the coded stream can be obtained based on the two decorrelation processed channel signals, and the flag bit can be written into the coded stream to be transmitted to the decoding device. A related description of this part can be referred to the preceding embodiments, and the embodiments of the present disclosure will not repeat the related description herein.

It should also be noted that the above contents of the present embodiment describe processing the stereo audio signal based on the cross-correlation between the left channel signal and the right channel signal of the current frame of the stereo audio signal. In another embodiment of the present disclosure, the stereo audio signal may also be processed based on the phase difference between the left channel signal and the right channel signal of the current frame of the stereo audio signal. In an example, the first phase difference between the left channel signal and the right channel signal of the current frame may be firstly determined. If the first phase difference between the left channel signal and the right channel signal of the current frame lies in the second interval, the current frame of the stereo audio signal is determined as the near in-phase signal, the current frame of the stereo audio signal is decorrelated by using the second decorrelation processing method to obtain the two decorrelation processed channel signals, and the third phase difference between the two decorrelation processed channel signals is calculated. In response to the first phase difference being less than or equal to the third phase difference, it is indicated that the second decorrelation processing method does not achieve the purpose of decorrelation. Then the current frame of the stereo audio signal is directly determined as the two decorrelation processed channel signals, the flag bit is determined to be the third value, the coded stream is obtained based on the two decorrelation processed channel signals, and the flag bit is written into the coded stream to be transmitted to the decoding device. The second interval may be [0°, 45°].

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal in order to obtain the two decorrelation processed channel signals. And thereafter, the second cross-correlation coefficient for the two decorrelation processed channel signals is calculated. In response to the first cross-correlation coefficient being less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide the way of determining the near out-of-phase signal and the corresponding decorrelation processing method, which greatly improves the coding compression ratio of the near out-of-phase signal.

Figure 4A:
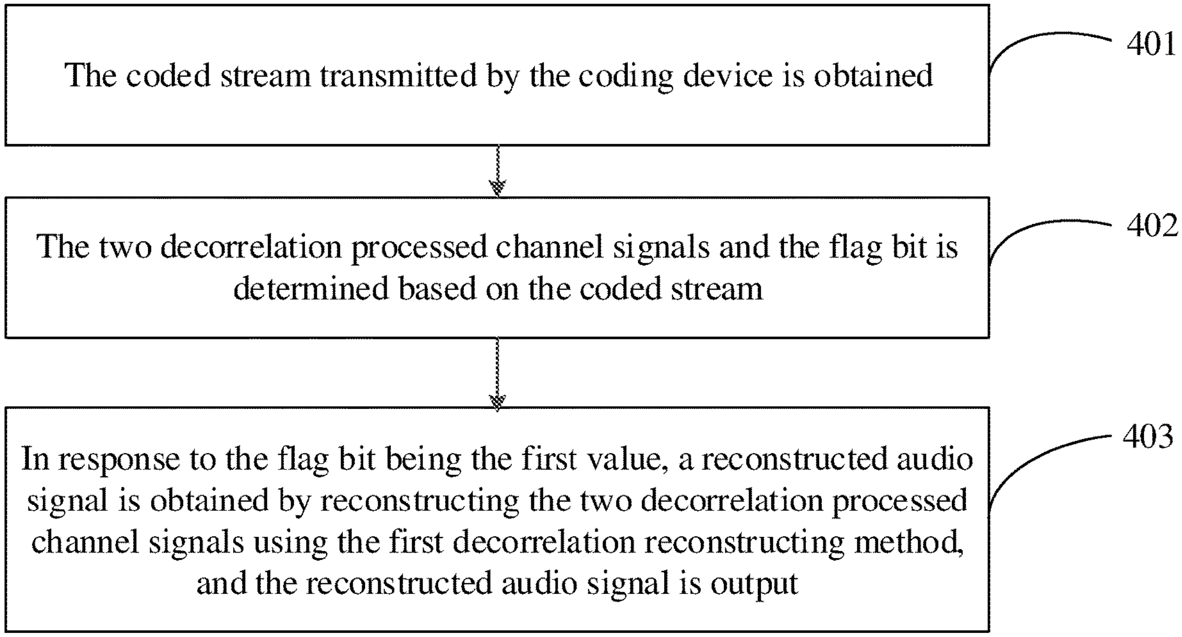
FIG. 4*a* is a schematic flow chart of a stereo audio signal processing method provided by embodiments of the present disclosure.

FIG. 4*a* is a schematic flow chart of a stereo audio signal processing method provided by embodiments of the present disclosure which is performed by the decoding device. As shown in FIG. 4*a*, the stereo audio signal processing method includes the following steps.

Step 401: the coded stream transmitted by the coding device is obtained.

Step 402, the two decorrelation processed channel signals and the flag bit is determined based on the coded stream.

Figure 4B:
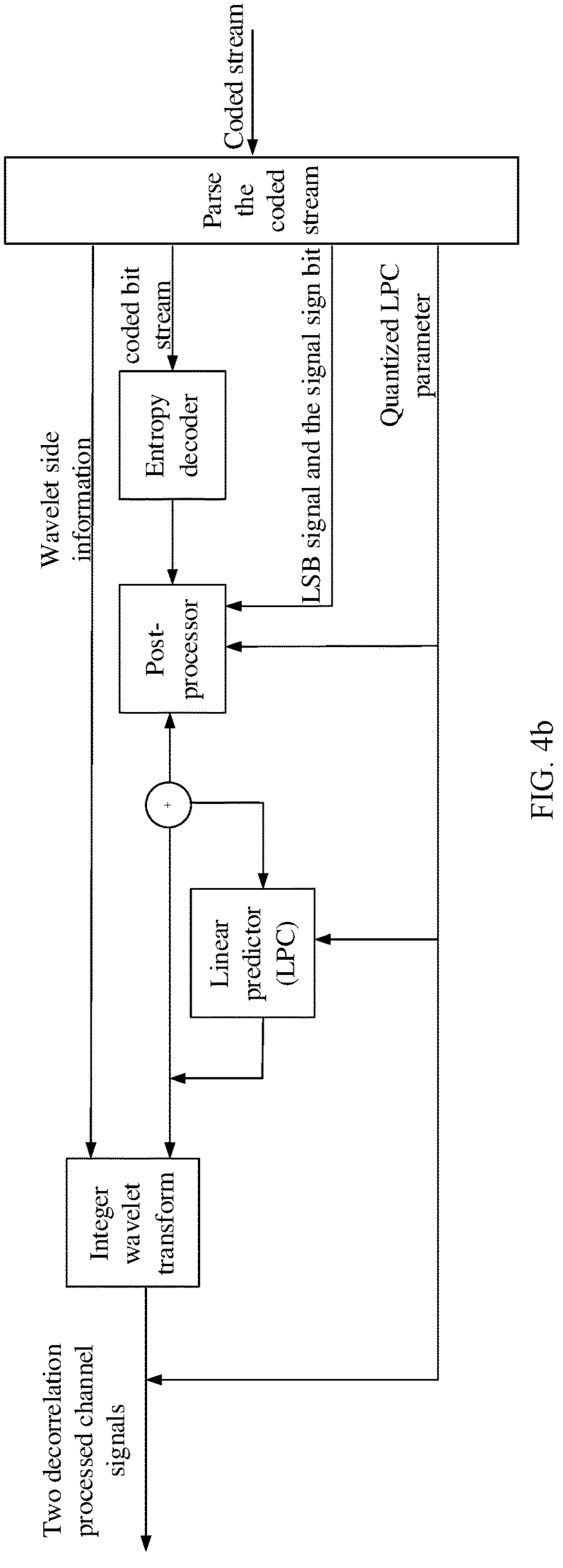
FIG. 4*b* is a block diagram of a process for determining two decorrelation processed channel signals based on a coded stream provided by embodiments of the present disclosure.

FIG. 4*b* is a block diagram of a process for determining two decorrelation processed channel signals based on a coded stream provided by embodiments of the present disclosure. As shown in FIG. 4*b*, the method for determining the two decorrelation processed channel signals based on the coded stream is as follows.

After obtaining the coded stream, the coded stream is firstly parsed to obtain the coded bit stream, the flag bit, the LSB signal, the signal sign bit, the quantized LPC parameters, and the wavelet side information, the coded stream is entropy decoded by using an entropy decoder to obtain a decoded signal, and then the decoded signal is processed by a post-processor based on the LSB signal and the signal sign bit to generate the predicted residual. After that, the predicted residual is reconstructed by using the linear predictor based on the quantized LPC parameters to generate the subband signals. And then the subband signals are reconstructed by using integer wavelet transform based on the wavelet side information to obtain the two decorrelation processed channel signals.

Step 403: in response to the flag bit being the first value, a reconstructed audio signal is obtained by reconstructing the two decorrelation processed channel signals using the first decorrelation reconstructing method, and the reconstructed audio signal is output.

In an embodiment of the present disclosure, in response to the flag bit being the first value (e.g., 0), it is indicated that the coding device uses the first decorrelation processing method to decorrelate the stereo audio signal. Based on this, the first decorrelation reconstructing method corresponding to the first decorrelation processing method may be used to reconstruct the two decorrelation processed channel signals to obtain the reconstructed audio signal, and the reconstructed audio signal is output.

In an embodiment of the present disclosure, the two decorrelation processed channel signals may include the primary channel signal and the secondary channel signal. Also, the first decorrelation reconstructing method may include: reconstructing the two decorrelation processed channel signals based on a formula V, where the formula V is:

$$\begin{cases} L(n) = \mathrm{Mid}(n) + \dfrac{(\mathrm{Sid}(n) + \mathrm{Sid}(n)\ \&1)}{2} \\ R(n) = \dfrac{(\mathrm{Sid}(n) + \mathrm{Sid}(n)\ \&1)}{2} - \mathrm{Mid}(n) \end{cases}$$

where the Mid(n) is the primary channel signal of the two decorrelation processed channel signals, the Sid(n) is the secondary channel signal of the two decorrelation processed channel signals, the L(n) is the left channel signal, and the R(n) is the right channel signal.

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal to obtain the two decorrelation processed channel signals. And thereafter, the second cross-correlation coefficient for the two decorrelation processed channel signals is calculated. When the first cross-correlation coefficient is less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the coding compression ratio of the near out-of-phase signal.

Figures 5, 6:
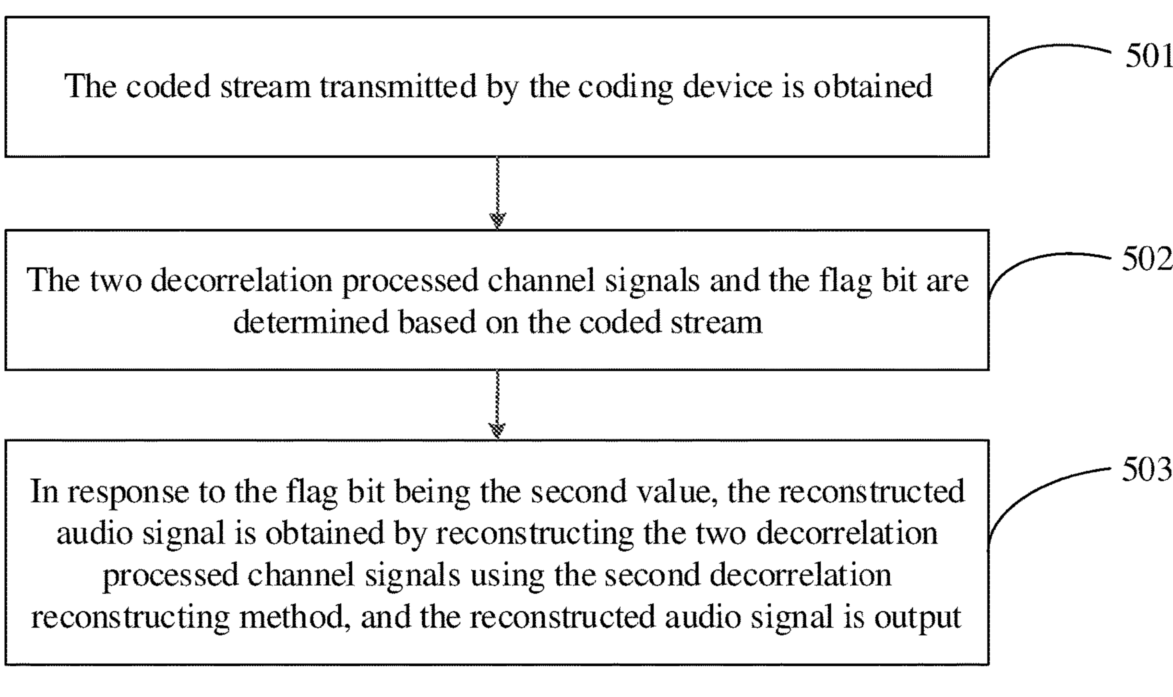
FIG. 5 is a schematic flow chart of a stereo audio signal processing method provided by embodiments of the present disclosure.
FIG. 6 is a schematic flow chart of a stereo audio signal processing method provided by embodiments of the present disclosure.

FIG. 5 is a schematic flow chart of a stereo audio signal processing method provided by embodiments of the present disclosure which is performed by the decoding device. As shown in FIG. 5, the stereo audio signal processing method includes the following steps.

Step 501: the coded stream transmitted by the coding device is obtained.

Step 502: the two decorrelation processed channel signals and the flag bit are determined based on the coded stream.

A related description of steps 501 to 502 can be found in the description of above the embodiments, and the embodiments of the present disclosure will not repeat the related description herein.

Step 503: in response to the flag bit being the second value, a reconstructed audio signal is obtained by reconstructing the two decorrelation processed channel signals using the second decorrelation reconstructing method, and the reconstructed audio signal is output.

In an embodiment of the present disclosure, in response to the flag bit being the second value (e.g., it may be 1), it is indicated that the coding device is using the second decorrelation processing method to decorrelate the stereo audio signal. Based on this, the second decorrelation reconstructing method corresponding to the second decorrelation processing method may be used to reconstruct the two decorrelation processed channel signals to obtain a reconstructed audio signal and the reconstructed audio signal is output.

In an embodiment of the present disclosure, the two decorrelation processed channel signals may include the primary channel signal and the secondary channel signal. Also, the second decorrelation reconstructing method may include: reconstructing the two decorrelation processed channel signals based on a formula VI, where the formula VI is:

$$\begin{cases} L(n) = \text{Mid}(n) + \dfrac{(\text{Sid}(n) + \text{Sid}(n)\ \&1)}{2} \\ R(n) = \text{Mid}(n) - \dfrac{(\text{Sid}(n) + \text{Sid}(n)\ \&1)}{2} \end{cases}$$

where the Mid(n) is the primary channel signal of the two decorrelation processed channel signals, the Sid(n) is the secondary channel signal of the two decorrelation processed channel signals, the L(n) is the left channel signal, and the R(n) is the right channel signal.

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal in order to obtain the two decorrelation processed channel signals. And thereafter, a second cross-correlation coefficient for the two decorrelation processed channel signals is calculated. In response to the first cross-correlation coefficient is less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the coding compression ratio of the near out-of-phase signal.

FIG. 6 is a schematic flow chart of a stereo audio signal processing method provided by embodiments of the present disclosure which is performed by the decoding device. As shown in FIG. 6, the stereo audio signal processing method includes the following steps.

Step 601: a coded stream transmitted by the coding device is obtained.

Step 602, two decorrelation processed channel signals and a flag bit are determined based on the coded stream.

A related description of steps 601 to 602 can be found in the description of the above embodiments, and the embodiments of the present disclosure will not repeat the related description herein.

Step 603, in response to the flag bit being the third value, the two decorrelation processed channel signals are determined as a reconstructed audio signal directly.

In an embodiment of the present disclosure, in response to the flag bit being the third value (e.g., 2), it is indicated that the coding device does not perform the decorrelation process. Based on this, the two decorrelation processed channel signals can be directly determined as the reconstructed audio signal.

In summary, in the stereo audio signal processing method provided in embodiments of the present disclosure, the first cross-correlation coefficient for the left channel signal and the right channel signal of the current frame of the stereo audio signal is firstly determined. When the first cross-correlation coefficient is less than the first threshold, the first decorrelation processing method is used to perform decorrelation processing on the current frame of the stereo audio signal in order to obtain the two decorrelation processed channel signals. And thereafter, a second cross-correlation coefficient for the two decorrelation processed channel signals is calculated. In response to the first cross-correlation coefficient is less than the second cross-correlation coefficient, the flag bit is determined to be the first value, the coded stream is obtained based on the two decorrelation processed channel signals, and the flag bit is written into the coded stream to be transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the coding compression ratio of the near out-of-phase signal.

Figures 7, 8:
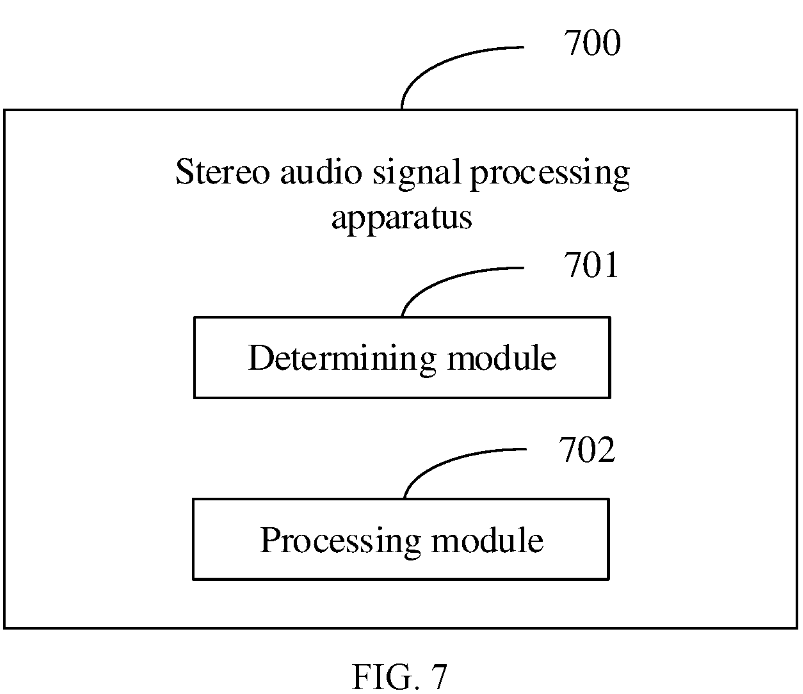
FIG. 7 is a schematic structure diagram of a stereo audio signal processing apparatus provided by embodiments of the present disclosure.
FIG. 8 is a schematic structure diagram of a stereo audio signal processing apparatus provided by embodiments of the present disclosure.

FIG. 7 is a schematic structure diagram of a stereo audio signal processing apparatus provided by embodiments of the present disclosure which is performed by the coding side. As shown in FIG. 7, the apparatus 700 may include:

a determining module 701, for determining a first cross-correlation coefficient for a left channel signal and a right channel signal of a current frame of a stereo audio signal; and a processing module 702, for, in response to the first cross-correlation coefficient being less than a first threshold, using a first decorrelation processing method to decorrelate the current frame of the stereo audio signal to obtain two decorrelation processed channel signals, calculating a second cross-correlation coefficient for the two decorrelation processed channel signals, and in response to the first cross-correlation coefficient being less than the second cross-correlation coefficient, determining a flag bit to be a first value, obtaining a coded stream based on the two decorrelation processed channel signals, and writing the flag bit into the coded stream, wherein a value of the first threshold value is in a range of (−1, 0).

In summary, in the stereo audio signal processing method provided in embodiments of the present disclosure, the first cross-correlation coefficient for the left channel signal and the right channel signal of the current frame of the stereo audio signal is firstly determined. In response to the first cross-correlation coefficient being less than the first threshold, the first decorrelation processing method is used to perform decorrelation processing on the current frame of the stereo audio signal in order to obtain the two decorrelation processed channel signals. And thereafter, a second cross-correlation coefficient for the two decorrelation processed channel signals is calculated. In response to the first cross-correlation coefficient is less than the second cross-correlation coefficient, the flag bit is determined to be the first value, the coded stream is obtained based on the two decorrelation processed channel signals, and the flag bit is written into the coded stream and transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the compression ratio of the near out-of-phase signal.

In an example, in an embodiment of the present disclosure, the first decorrelation processing method includes a first Mid/Side down-mixing processing.

In an example, in an embodiment of the present disclosure, the first Mid/Side down-mixing processing includes:

processing the left channel signal and right channel signal to obtain a primary channel signal and a secondary channel signal based on a formula I, where the formula I is:

$$\begin{cases} Mid(n) = \frac{(L(n) - R(n))}{2} \\ Sid(n) = L(n) + R(n) \end{cases}$$

where the Mid(n) is the primary channel signal, the Sid(n) is the secondary channel signal, the L(n) is the left channel signal, and the R(n) is the right channel signal.

In an example, in an embodiment of the present disclosure, the apparatus is further for:

in response to the first cross-correlation coefficient being greater than a second threshold, using a second decorrelation processing method to decorrelate the current frame of the stereo audio signal to obtain two decorrelation processed channel signals, calculating a third cross-correlation coefficient for the two decorrelation processed channel signals, and in response to the first cross-correlation coefficient being greater than the third cross-correlation coefficient, determining a flag bit to be a second value, obtaining a coded stream based on the two decorrelation processed channel signals, and writing the flag bit into the coded stream, where a value of the second threshold is in a range of (0, 1).

In an example, in an embodiment of the present disclosure, the second decorrelation processing method includes a second Mid/Side down-mixing processing.

In an example, in an embodiment of the present disclosure, the second Mid/Side down-mixing processing includes:

processing the left channel signal and right channel signal to obtain a primary channel signal and a secondary channel signal based on a formula II, where the formula II is:

$$\begin{cases} Mid(n) = \frac{(L(n) + R(n))}{2} \\ Sid(n) = L(n) - R(n) \end{cases}$$

where the Mid(n) is a primary channel signal, the Sid(n) is a secondary channel signal, the L(n) is the left channel signal, and the R(n) is the right channel signal.

In an example, in an embodiment of the present disclosure, the apparatus is further for:

in response to the first cross-correlation coefficient being greater than or equal to the first threshold and less than or equal to the second threshold, or the first cross-correlation coefficient being less than the first threshold and the first cross-correlation coefficient being greater than or equal to the second cross-correlation coefficient, or the first cross-correlation coefficient being greater than the second threshold and the first cross-correlation coefficient being less than or equal to the third cross-correlation coefficient, directly determining the current frame of the stereo audio signal to be two decorrelation processed channel signals, determining a flag bit to be a third value, and obtaining a coded stream based on the two decorrelation processed channel signals, and writing the flag bit into the coded stream.

In an example, in an embodiment of the present disclosure, the determining module is further for:

determining the first cross-correlation coefficient for the left channel signal and the right channel signal based on a formula III, where the formula III is:

$$\begin{cases} \eta_{(LR)} = \frac{\sum_{n=1}^{N} (L(n) - \overline{L}) \times (R(n) - \overline{R})}{\sqrt{\sum_{n=1}^{N} (L(n) - \overline{L})^2} \times \sqrt{\sum_{n=1}^{N} (R(n) - \overline{R})^2}} \\ \overline{L} = \frac{\sum_{n=1}^{N} L(n)}{N} \\ \overline{R} = \frac{\sum_{n=1}^{N} R(n)}{N} \end{cases}$$

wherein the $\eta_{(LR)}$ is the cross-correlation coefficient for the left channel signal and the right channel signal of the current frame, the L(n) is a $n^{th}$ sample point of the left channel signal of the current frame, the $\overline{L}$ is an average of all sample points of the left channel signal of the current frame, the R(n) is a $n^{th}$ sample point of the right channel signal of the current frame, the $\overline{R}$ is an average of all sample points of the right channel signal of the current frame, the N is a total number of sample points of the left channel signal or the right channel signal of the current frame, i.e., a length of the current frame.

In an example, in an embodiment of the present disclosure, the two decorrelation processed channel signals include a primary channel signal and a secondary channel signal:

the apparatus is further for:

determining the second cross-correlation coefficient and the third cross-correlation coefficient based on a formula IV, where the formula IV is:

$$\begin{cases} \eta_{(MS)} = \frac{\sum_{n=1}^{N} (Mid(n) - \overline{M_1 d}) \times (Sid(n) - \overline{S_1 d})}{\sqrt{\sum_{n=1}^{N} (Mid(n) - \overline{M_1 d})^2} \times \sqrt{\sum_{n=1}^{N} (Sid(n) - \overline{S_1 d})^2}} \\ \overline{M_1 d} = \frac{\sum_{n=1}^{N} Mid(n)}{N} \\ \overline{S_1 d} = \frac{\sum_{n=1}^{N} S_1 d(n)}{N} \end{cases}$$

wherein the $\eta_{(MS)}$ is the second cross-correlation coefficient or the third cross-correlation coefficient, the Mid (n) is a $n^{th}$ sample point of the primary channel signal of the two decorrelation processed channel signals, the $\overline{\text{Mid}}$ is an average of all sample points of the primary channel signal of the two decorrelation processed channel signals, the Sid(n) is a $n^{th}$ sample point of the secondary channel signal of the two decorrelation processed channel signals, the $\overline{\text{Sid}}$ is an average of all sample points of the secondary channel signal of the two decorrelation processed channel signals, and the N is a total number of sample points of the left channel signal or the right channel signal of the current frame, i.e., a length of the current frame.

In summary, in the stereo audio signal processing method provided in embodiments of the present disclosure, the first cross-correlation coefficient for the left channel signal and the right channel signal of the current frame of the stereo audio signal is firstly determined. In response to the first cross-correlation coefficient being less than the first threshold, the first decorrelation processing method is used to perform decorrelation processing on the current frame of the stereo audio signal in order to obtain the two decorrelation processed channel signals. And thereafter, a second cross-correlation coefficient for the two decorrelation processed channel signals is calculated. In response to the first cross-correlation coefficient is less than the second cross-correlation coefficient, the flag bit is determined to be the first value, the coded stream is obtained based on the two decorrelation processed channel signals, and the flag bit is written into the coded stream and transmitted to the decoding device. In the embodiments of the present disclosure, the value of the first threshold is in the range of (−1, 0). Thereby when the first cross-correlation coefficient is less than the first threshold, it is indicated that the current frame of the stereo audio signal is the near out-of-phase signal for which the first decorrelation processing method will be adopted to ensure the subsequent compression ratio. The embodiments of the present disclosure provide a way of determining the near out-of-phase signal and the corresponding decorrelation processing method, which greatly improves the compression ratio of the near out-of-phase signal.

FIG. 8 is a schematic structure diagram of a stereo audio signal processing apparatus provided by embodiments of the present disclosure which is performed by a decoding end. As shown in FIG. 8, the apparatus 800 may include:

an obtaining module 801, for obtaining a coded stream transmitted by a coding device;

a determining module 802, for determining two decorrelation processed channel signals and a flag bit based on the coded stream; and a processing module 803, for, in response to the flag bit being a first value, obtaining a reconstructed audio signal by reconstructing the two decorrelation processed channel signals using a first decorrelation reconstructing method and outputting the reconstructed audio signal.

In an example, in an embodiment of the present disclosure, the first decorrelation reconstructing method includes:

reconstructing the two decorrelation processed channel signals based on a formula V, where the formula V is:

$$\begin{cases} L(n) = Mid(n) + \dfrac{(Sid(n) + Sid(n)\ \&1)}{2} \\ R(n) = \dfrac{(Sid(n) - Sid(n)\ \&1)}{2} - Mid(n) \end{cases}$$

wherein the Mid(n) is a primary channel signal of the two decorrelation processed channel signals, the Sid(n) is a secondary channel signal of the two decorrelation processed channel signals, the L(n) is a left channel signal, and the R(n) is a right channel signal.

In an example, in an embodiment of the present disclosure, the apparatus is further for:

in response to the flag bit being a second value, obtaining a reconstructed audio signal by reconstructing the two decorrelation processed channel signals using a second decorrelation reconstructing method, and outputting the reconstructed audio signal.

In an example, in an embodiment of the present disclosure, the second decorrelation reconstructing method includes:

reconstructing the two decorrelation processed channel signals based on a formula VI, where the formula VI is:

$$\begin{cases} L(n) = Mid(n) + \dfrac{(Sid(n) + Sid(n)\ \&1)}{2} \\ R(n) = Mid(n) - \dfrac{(Sid(n) - Sid(n)\ \&1)}{2} \end{cases}$$

where the Mid(n) is a primary channel signal of the two decorrelation processed channel signals, the Sid(n) is a secondary channel signal of the two decorrelation processed channel signals, the L(n) is a left channel signal, and the R(n) is a right channel signal.

In an example, in an embodiment of the present disclosure, the apparatus is further for:

in response to the flag bit being a third value, determining the two decorrelation processed channel signals as a reconstructed audio signal directly.

Figure 9:
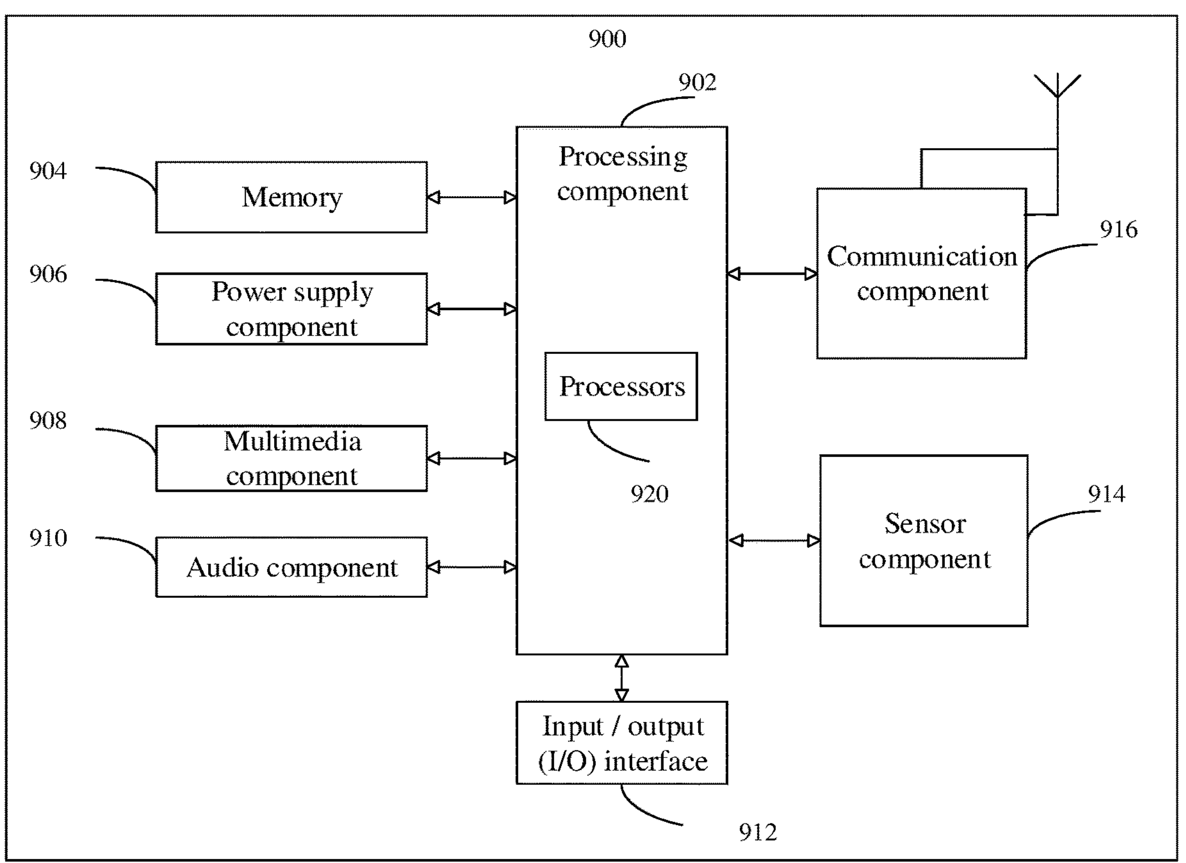
FIG. 9 is a block diagram of a user device provided by an embodiment of the present disclosure.

FIG. 9 is a block diagram of a user equipment (UE) 900 provided by an embodiment of the present disclosure. For example, the UE 900 may be a mobile phone, a computer, a digital broadcast terminal, a message transceiving device, a game console, a tablet device, a medical device, a fitness device and a personal digital assistant and so on.

As shown in FIG. 9, the UE 900 may include one or more of the following components: a processing component 902, a memory 904, a power supply component 906, a multimedia component 908, an audio component 910, an input/output (I/O) interface 912, a sensor component 913, and a communication component 916.

The processing component 902 generally controls the overall operations of the UE 900, such as operations associated with display, calling, data communication, camera operation and recording operation. The processing component 902 may include one or more processors 920 to execute instructions to complete all or a part of the blocks of the above methods. Further, the processing component 902 may include one or more modules to facilitate interaction between the processing component 902 and another component. For example, the processing component 902 may include a multimedia module to facilitate the interaction between the multimedia component 908 and the processing component 902.

The memory 904 is configured to store different types of data to support the operations of the UE 900. Examples of such data include instructions, contact data, phonebook data, messages, pictures, videos, and so on for any application or method that operates on the UE 900. The memory 904 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only Memory (ROM), a magnetic memory, a flash memory, a disk or a CD.

The power supply component 906 provides power for different components of the UE 900. The power supply component 906 may include a power management system, one or more power sources, and other components associated with generating, managing and distributing power for the UE 900.

The multimedia component 908 may include a screen for providing an output interface between the UE 900 and a user. In some examples, the screen may include a liquid crystal display (LCD) and a touch panel (TP). If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touching or sliding movement, but also detect wake-up duration and pressure related to the touching or sliding operation. In some examples, the multimedia component 908 may include a front camera and/or a rear camera. When the UE 900 is in an operation mode, such as a shooting mode or a video mode, the front camera and/or the rear camera may receive external multimedia data. Each of the front camera and the rear camera may be a fixed optical lens system or be of a focal length and a capability of an optical zoom.

The audio component 910 is configured to output and/or input an audio signal. For example, the audio component 910 may include a microphone (MIC). When the UE 900 is in an operating mode, such as a call mode, a recording mode and a speech recognition mode, the microphone is configured to receive an external audio signal. The received audio signal may be further stored in the memory 904 or sent via the communication component 916. In some examples, the audio component 910 also includes a speaker for outputting an audio signal.

The I/O interface 912 may provide an interface between the processing component 902 and peripheral interface modules. The above peripheral interface modules may include a keyboard, a click wheel, buttons and so on. These buttons may include but not limited to, a home button, a volume button, a start button and a lock button.

The sensor component 913 includes one or more sensors for providing state assessments in different aspects for the UE 900. For example, the sensor component 913 may detect an on/off state of the UE 900 and a relative location of components. For example, the components are a display and a keypad of the UE 900. The sensor component 913 may also detect a position change of the UE 900 or a component of the UE 900, presence or absence of a touch of a user on the UE 900, an orientation or acceleration/deceleration of the UE 900, and a temperature change of UE 900. The sensor component 913 may include a proximity sensor for detecting the existence of a nearby object without any physical touch. The sensor component 913 may also include an optical sensor, such as a CMOS or CCD image sensor used in an imaging application. In some examples, the sensor component 913 may also include an acceleration sensor, a gyro sensor, a magnetic sensor, a pressure sensor, or a temperature sensor.

The communication component 916 is configured to facilitate wired or wireless communication between the UE 900 and other devices. The UE 900 may access a wireless network based on a communication standard, such as WiFi, 2G or 3G, or a combination thereof. In an example, the communication component 916 the communication component 916 may receive a broadcast signal or broadcast-related information from an external broadcast management system via a broadcast channel. In an example, the communication component 916 may also include a near field communication (NFC) module to facilitate short-range communications. For example, the NFC module may be implemented based on radio frequency identity (RFID) technology, infrared data association (IrDA) technology, ultra-wideband (UWB) technology, bluetooth (BT) technology and other technologies.

In an example, the UE 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements, for executing the method in any one of the above examples.

Figure 10:
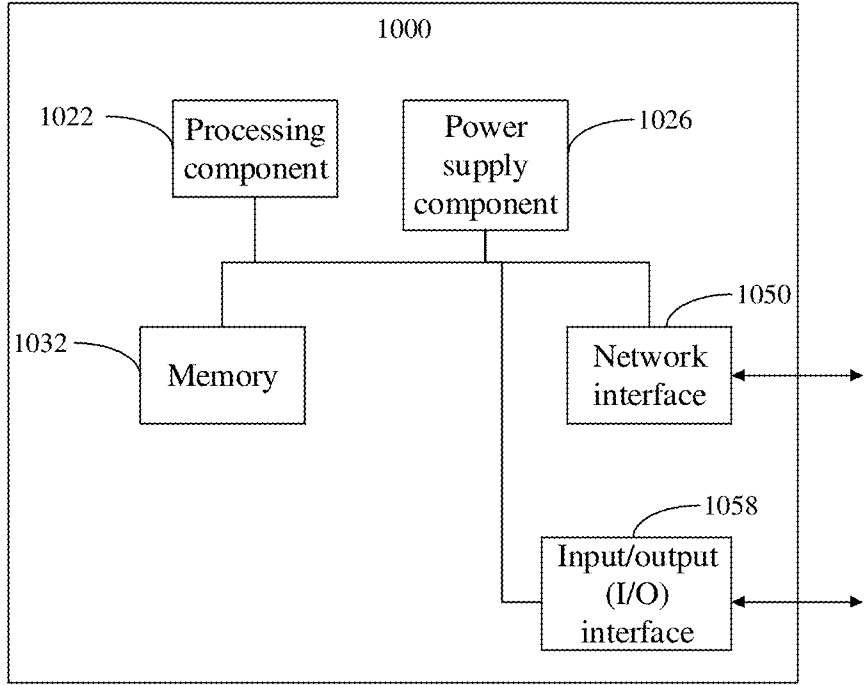
FIG. 10 is a block diagram of a network side device provided by an embodiment of the present disclosure.

FIG. 10 is a block diagram of a network side device 1000 provided by an embodiment of the present disclosure. For example, the network side device 1000 may be provided as a network-side device. Referring to FIG. 10, the network-side device 1000 includes a processing component 1022, which further includes at least one processor, and a memory resource represented by a memory 1032 for storing instructions, such as applications, executed by a processing component 1022. The application program stored in the memory 1032 may include one or more modules, and each module corresponds to a set of instructions respectively. In addition, the processing component 1022 is configured to execute instructions to perform any of the methods described in the foregoing method performed by the network-side device, e.g., the method shown in FIG. 1.

The network-side device 1000 may also include a power supply component 1026 configured to perform power management of the network-side device 1000, a wired/wireless network interface 1050 configured to connect the network-side device 1000 to a network, and an input/output (I/O) interface 1058. The network-side device 1000 may operate based on an operating system, such as Windows Server™, Mac OS X™, Unix™, Linux™, FreeBSD™ or the like, stored in the memory 1032.

In the above-described embodiments provided in the present disclosure, the methods provided in the embodiments of the present disclosure are described from the perspectives of the network-side device, and the UE, respectively. In order to realize each of the functions in the method provided by the above embodiments of the present disclosure, the network-side device and the UE may include a hardware structure and a software module, and realize each of the above functions in the form of the hardware structure, a software module, or a hardware structure plus a software module. A function of each of the above-described functions may be performed in the form of a hardware structure, a software module, or a hardware structure plus a software module.

In the above-described embodiments provided in the present disclosure, the methods provided in the embodiments of the present disclosure are described from the perspectives of the network-side device, and the UE, respectively. In order to realize each of the functions in the method provided by the above embodiments of the present disclosure, the network-side device and the UE may include a hardware structure and a software module, and realize each of the above functions in the form of a hardware structure, a software module, or a hardware structure plus a software module. A function of each of the above-described functions may be performed in the form of a hardware structure, a software module, or a hardware structure plus a software module.

Embodiments of the present disclosure provide a communication device. The communication device may include a transceiving module and a processing module. The transceiving module may include a transmitting module and/or a receiving module, the transmitting module for realizing a transmitting function, and the receiving module for realizing a receiving function, and the transceiving module may realize the transmitting and/or the receiving function.

The communication device may be a terminal device (such as the terminal device in the preceding method embodiment), a device in the terminal device, or a device capable of being matched for use with the terminal device. In an example, the communication device may be a network device, or a device in a network device, or a device capable of being matched for use with a network device.

Another communication device is provided by embodiments of the present disclosure. The communication device may be a network device, a terminal device (such as the terminal device in the foregoing method embodiments), a chip, a chip system, or a processor, etc., that supports the network device to implement the above-described method, or a chip, a chip system, or a processor, etc., that supports the terminal device to realize the above-described method. The device may be used to realize the method described in the foregoing method embodiments, as may be described in the foregoing method embodiments.

The communication device may include one or more processors. The processors may be general processors or specialized processors, etc. For example, the processors may be baseband processors or central processors. The baseband processors may be used for processing communication protocols as well as communication data, and the central processors may be used for controlling the communication device (e.g., network-side device, baseband chip, terminal device, terminal device chip, DU or CU, etc.), executing a computer program, and processing data from the computer program.

In an example, the communication device may further include one or more memories on which a computer program may be stored, the processor executing the computer program to cause the communication device to perform the method described in the above method embodiment. In an example, data may also be stored in the memory. The communication device and the memory may be provided separately or may be integrated together.

In an example, the communication device may also include a transceiver and an antenna. The transceiver may be referred to as a transceiver unit, a transceiver, or a transceiver circuit, etc., and is used to implement the transceiving function. The transceiver may include a receiver and a transmitter, where the receiver may be referred to as a receiver or a receiving circuit, etc., for implementing the receiving function, and the transmitter may be referred to as a transmitter or a transmitting circuit, etc., for implementing the transmitting function.

In an example, one or more interface circuits may also be included in the communication device. The interface circuits are used to receive code instructions and transmit the code instructions to the processor. The processor runs the code instructions to cause the communication device to perform the method described in the method embodiment above.

The communication device is a terminal device (such as the terminal device in the preceding method embodiment): the processor is used to perform the method shown in any one of FIGS. 1 to 4*a*.

The communication device is a network device: the transceiver is used to perform the method shown in any of FIGS. 5 to 7.

In one implementation, transceivers for receiving and transmitting may be included in the processor. The transceivers may be, for example, transceiver circuits, interfaces, or interface circuits. The transceiver circuits, interfaces, or interface circuits for receiving and transmitting may be separate or may be integrated together. The transceiver circuits, interfaces, or interface circuits described above may be used for code/data reading and writing, or, the transceiver circuits, interfaces, or interface circuits described above may be used for signal transmission or delivery.

In one implementation, the processor may store a computer program which runs on the processor to cause the communication device to perform the methods described in the method embodiments above. The computer program may be solidified in the processor, in which case the processor may be implemented by hardware.

In one implementation, the communication device may include circuitry, and the circuitry may implement the functions of sending, receiving or communicating in the preceding method embodiments. The processors and transceivers described in this disclosure may be implemented on integrated circuits (ICs), analog ICs, radio frequency integrated circuits RFICs, mixed signal ICs, application specific integrated circuits (ASICs), printed circuit boards (PCBs), electronic equipment, etc. The processors and transceivers may also be manufactured by using various materials processed by IC technologies such as a complementary metal oxide semiconductor (CMOS), nMetal-oxidesemiconductor (NMOS), positive channel metal oxide semiconductor, (PMOS), bipolar junction transistor (BJT), bipolar CMOS (BiCMOS), silicon-germanium (SiGe), gallium arsenide (Gas) and so on.

The communication device in the above description of embodiments may be a network device or a terminal device (such as the terminal device in the previous method embodiments), but the scope of the communication device described in this disclosure is not limited thereto, and the structure of the communication device may not be limited thereto. The communication device may be a stand-alone device or may be part of a larger device. For example the described communication device may be:

(1) a stand-alone integrated circuit IC or chip, or, a system on chip or subsystem on chip;

(2) a collection of one or more ICs, in an example, the collection of ICs may also include storage components for storing data and computer programs;

(3) an ASIC, such as a modem;

(4) a module that can be embedded in other equipment;

(5) a receiver, terminal device, intelligent terminal device, cellular phone, wireless device, handheld, mobile unit, on-vehicle device, network device, cloud device, artificial intelligence device, or the like;

(6) others, etc.

For the case where the communication device may be a chip or a system-on-a-chip, the chip includes processor(s) and interfaces. The number of the processor(s) may be one or more and the number of the interfaces may be more than one.

In an example, the chip further includes a memory, the memory being used to store necessary computer programs and data.

Those skilled in the art may also appreciate that the various illustrative logical blocks and steps set forth in embodiments of the present disclosure may be implemented by electronic hardware, computer software, or a combination of both. Whether such functions are implemented by hardware or software depends on the particular application and the design requirements of the overall system. Those skilled in the art, for each particular application, may use various methods to implement the described functions, but such implementations should not be construed as being outside the scope of protection of the embodiments of the present disclosure.

Embodiments of the present disclosure also provide a system for determining a side link duration, including a communication device as a terminal device (such as the first terminal device in the preceding method embodiment) and a communication device as a network device in the preceding embodiment, or, including a communication device as a terminal device (such as the first terminal device in the preceding method embodiment) and a communication device as a network device in the preceding embodiment.

The present disclosure also provides a readable storage medium having instructions stored thereon, the instructions when executed by a computer, implementing the functions of any of the method embodiments described above.

The present disclosure also provides a computer program product that, when executed by a computer, implements the functions of any of the method embodiments described above.

The above embodiments may be implemented in whole or in part by a software, hardware, firmware, or any combination thereof. When using a software to implement, the above embodiments may be implemented, in whole or in part, in a form of a computer program product. The computer program product includes one or more computer programs. Loading and executing the computer program on a computer produces, in whole or in part, a process or function in accordance with embodiments of the present disclosure. The computer may be a general computer, a specialized computer, a computer network, or other programmable device. The computer program may be stored in a computer-readable storage medium or transmitted from one computer-readable storage medium to another computer-readable storage medium, e.g., the computer program may be transmitted from a web site, computer, server, or data center via a wired way (e.g., coaxial cable, fiber optic, digital subscriber line (DSL)) or wireless way (e.g., infrared, radio, microwave, etc.) to another website site, computer, server, or data center. The computer-readable storage medium may be any usable medium to which a computer can access or a data storage device such as a server, data center, etc. integrated by one or more usable media. The usable medium may be a magnetic medium (e.g., floppy disk, hard disk, tape), an optical medium (e.g., a high-density digital video disc (DVD)), a semiconductor medium (e.g., a solid state disk (SSD)) or the like.

A person of ordinary skill in the art may understand that the first, second, and other various numerical numbers involved in the present disclosure are only described for the convenience of differentiation, and are not used to limit the scope of the embodiments of the present disclosure or indicate an order of precedence.

The at least one of the present disclosure may also be described as one or more, and the plurality may be two, three, four, or more, without limitation of the present disclosure. In embodiments of the present disclosure, for a kind of technical features, a technical feature is described by "first", "second", "third", "A", "B", "C", and "D", etc., to distinguish the technical features in the kind of technical features, and the technical features described by the "first", "second", "third", "A", "B", "C" and "D" have no order of priority or size thereof.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of the disclosure is to be limited only by the appended claims.

The invention claimed is:

1. A stereo audio signal processing method, performed by a coding device, comprising:

determining a first cross-correlation coefficient for a left channel signal and a right channel signal of a current frame of a stereo audio signal to identify a correlation form of the current frame of the stereo audio signal; and in response to the first cross-correlation coefficient being less than a first threshold, obtaining two decorrelation processed channel signals by using a first decorrelation processing method to decorrelate the current frame of the stereo audio signal, calculating a second cross-correlation coefficient for the two decorrelation processed channel signals to determine whether a decorrelation is achieved by the first decorrelation process method, and in response to the first cross-correlation coefficient being less than the second cross-correlation coefficient, determining a flag bit to be a first value, encoding the two decorrelation processed channel signals to obtain a coded stream, and writing the flag bit into the coded stream, wherein a value of the first threshold is in a range of (−1, 0).

2. The stereo audio signal processing method of claim 1, wherein the first decorrelation processing method comprises a first Mid/Side down-mixing processing.

3. The stereo audio signal processing method of claim 2, wherein the first Mid/Side down-mixing processing comprises:

processing the left channel signal and right channel signal to obtain a primary channel signal and a secondary channel signal based on a formula I, wherein, the formula I is:

$$\begin{cases} Mid(n) = \frac{(L(n) - R(n))}{2} \\ Sid(n) = L(n) + R(n) \end{cases}$$

wherein the Mid(n) is the primary channel signal, the Sid(n) is the secondary channel signal, the L(n) is the left channel signal, and the R(n) is the right channel signal.

4. The stereo audio signal processing method of claim 1, further comprising:

in response to the first cross-correlation coefficient being greater than a second threshold, obtaining two decorrelation processed channel signals by using a second decorrelation processing method to decorrelate the current frame of the stereo audio signal, calculating a third cross-correlation coefficient for the two decorrelation processed channel signals, and in response to the first cross-correlation coefficient being greater than the third cross-correlation coefficient, determining a flag bit to be a second value, obtaining a coded stream based on the two decorrelation processed channel signals, and writing the flag bit into the coded stream, wherein a value of the second threshold is in a range of (0, 1).

5. The stereo audio signal processing method of claim 4, wherein the second decorrelation processing method comprises a second Mid/Side down-mixing processing.

6. The stereo audio signal processing method of claim 5, wherein the second Mid/Side down-mixing processing comprises:

processing the left channel signal and the right channel signal to obtain a primary channel signal and a secondary channel signal based on a formula II, wherein the formula II is:

$$\begin{cases} Mid(n) = \frac{(L(n)+R(n))}{2} \\ Sid(n) = L(n) - R(n) \end{cases}$$

wherein the Mid(n) is the primary channel signal, the Sid(n) is the secondary channel signal, the L(n) is the left channel signal, and the R(n) is the right channel signal.

7. The stereo audio signal processing method of claim 4, further comprising:

in response to the first cross-correlation coefficient being greater than or equal to the first threshold and less than or equal to the second threshold, or the first cross-correlation coefficient being less than the first threshold and the first cross-correlation coefficient being greater than or equal to the second cross-correlation coefficient, or the first cross-correlation coefficient being greater than the second threshold and the first cross-correlation coefficient being less than or equal to the third cross-correlation coefficient, directly determining the current frame of the stereo audio signal to be two decorrelation processed channel signals, determining a flag bit to be a third value, and obtaining a coded stream based on the two decorrelation processed channel signals, and writing the flag bit into the coded stream.

8. The stereo audio signal processing method of claim 1, wherein determining the first cross-correlation coefficient for the left channel signal and the right channel signal of the current frame of the stereo audio signal comprises:

determining the first cross-correlation coefficient for the left channel signal and the right channel signal based on a formula III, wherein the formula III is:

$$\begin{cases} \eta_{(LR)} = \frac{\sum_{n=1}^{N}(L(n)-\overline{L})\times(R(n)-\overline{R})}{\sqrt{\sum_{n=1}^{N}(L(n)-\overline{L})^2}\times\sqrt{\sum_{n=1}^{N}(R(n)-\overline{R})^2}} \\ \overline{L} = \frac{\sum_{n=1}^{N}L(n)}{N} \\ \overline{R} = \frac{\sum_{n=1}^{N}R(n)}{N} \end{cases}$$

wherein then$_{(LR)}$ is the cross-correlation coefficient for the left channel signal and the right channel signal of the current frame, the L(n) is a n$^{th}$ sample point of the left channel signal of the current frame, the $\overline{L}$ is an average of all sample points of the left channel signal of the current frame, the R(n) is a n$^{th}$ sample point of the right channel signal of the current frame, the $\overline{R}$ is an average of all sample points of the right channel signal of the current frame, the N is a total number of sample points of the left channel signal or the right channel signal of the current frame, i.e., a length of the current frame.

9. The stereo audio signal processing method of claim 4, wherein the two decorrelation processed channel signals comprises a primary channel signal and a secondary channel signal;

calculating the second cross-correlation coefficient and the third cross-correlation coefficient for the two decorrelation processed channel signals, comprising:

determining the second cross-correlation coefficient and the third cross-correlation coefficient based on a formula IV, wherein the formula IV is:

$$\begin{cases} \eta_{(MS)} = \frac{\sum_{n=1}^{N}(Mid(n)-\overline{M_1d})\times(Sid(n)-\overline{S_1d})}{\sqrt{\sum_{n=1}^{N}(Mid(n)-\overline{M_1d})^2}\times\sqrt{\sum_{n=1}^{N}(Sid(n)-\overline{S_1d})^2}} \\ \overline{M_1d} = \frac{\sum_{n=1}^{N}Mid(n)}{N} \\ \overline{S_1d} = \frac{\sum_{n=1}^{N}S_1d(n)}{N} \end{cases}$$

wherein then$_{(Ms)}$ is the second cross-correlation coefficient or the third cross-correlation coefficient, the Mid (n) is a n$^{th}$ sample point of the primary channel signal of the two decorrelation processed channel signals, the $\overline{Mid}$ is an average of all sample points of the primary channel signal of the two decorrelation processed channel signals, the Sid(n) is a n$^{th}$ sample point of the secondary channel signal of the two decorrelation processed channel signals, the $\overline{Sid}$ is an average of all sample points of the secondary channel signal of the two decorrelation processed channel signals, and the N is a total number of sample points of the left channel signal or the right channel signal of the current frame, i.e., a length of the current frame.

10. A stereo audio signal processing method, performed by a decoding device, comprising:

obtaining a coded stream transmitted by a coding device;

determining two decorrelation processed channel signals and a flag bit based on the coded stream; and in response to the flag bit being a first value, obtaining a reconstructed audio signal by reconstructing the two decorrelation processed channel signals using a first decorrelation reconstructing method, and outputting the reconstructed audio signal;

wherein the two decorrelation processed channel signals are obtained by decorrelating a current frame of the stereo audio signal; the flag bit being the first value indicates that a first cross-correlation coefficient for a left channel signal and a right channel signal of the current frame of the stereo audio signal before decorrelation is less than a second cross-correlation coefficient for the two decorrelation processed channel signals.

11. The stereo audio signal processing method of claim 10, wherein the first decorrelation reconstructing method comprises:

reconstructing the two decorrelation processed channel signals based on a formula V, wherein, the formula V is:

$$\begin{cases} L(n) = Mid(n) + \dfrac{(Sid(n) + Sid(n)\,\&1)}{2} \\ R(n) = \dfrac{(Sid(n) - Sid(n)\,\&1)}{2} - Mid(n) \end{cases}$$

wherein the Mid(n) is a primary channel signal of the two decorrelation processed channel signals, the Sid(n) is a secondary channel signal of the two decorrelation processed channel signals, the L(n) is a left channel signal, and the R(n) is a right channel signal.

12. The stereo audio signal processing method of claim 10, further comprising:

in response to the flag bit being a second value, obtaining a reconstructed audio signal by reconstructing the two decorrelation processed channel signals using a second decorrelation reconstructing method, and outputting the reconstructed audio signal.

13. The stereo audio signal processing method of claim 12, wherein the second decorrelation reconstructing method comprises:

reconstructing the two decorrelation processed channel signals based on a formula VI, wherein, the formula VI is:

$$\begin{cases} L(n) = Mid(n) + \dfrac{(Sid(n) + Sid(n)\,\&1)}{2} \\ R(n) = Mid(n) - \dfrac{(Sid(n) - Sid(n)\,\&1)}{2} \end{cases}$$

wherein the Mid(n) is a primary channel signal of the two decorrelation processed channel signals, the Sid(n) is a secondary channel signal of the two decorrelation processed channel signals, the L(n) is a left channel signal, and the R(n) is a right channel signal.

14. The stereo audio signal processing method of claim 10, further comprising:

in response to the flag bit being a third value, determining the two decorrelation processed channel signals as a reconstructed audio signal.

15. A communication apparatus, comprising:

a processor; and a memory storing a computer program executable by the processor;

wherein the processor is configured to perform:

determining a first cross-correlation coefficient for a left channel signal and a right channel signal of a current frame of a stereo audio signal to identify a correlation form of the current frame of the stereo audio signal; and in response to the first cross-correlation coefficient being less than a first threshold, obtaining two decorrelation processed channel signals by using a first decorrelation processing method to decorrelate the current frame of the stereo audio signal, calculating a second cross-correlation coefficient for the two decorrelation processed channel signals to determine whether a decorrelation is achieved by the first decorrelation process method, and in response to the first cross-correlation coefficient being less than the second cross-correlation coefficient, determining a flag bit to be a first value, encoding the two decorrelation processed channel signals to obtain a coded stream, and writing the flag bit into the coded stream, wherein a value of the first threshold is in a range of (−1, 0).

16. A communication apparatus, comprising:

a processor; and a memory storing a computer program executable by the processor;

wherein the processor is configured to perform the method of claim 10.

17. A communication apparatus, comprising:

a processor; and an interface circuit;

wherein the interface circuit is configured to receive code instructions and transmit the code instructions to the processor; and the processor is configured to execute the code instructions to perform the method of claim 1.

18. A communication apparatus, comprising:

a processor; and an interface circuit;

wherein the interface circuit is configured to receive code instructions and transmit the code instructions to the processor; and the processor is configured to execute the code instructions to perform the method of claim 10.

19. A non-transitory computer-readable storage medium storing instructions that, when executed by a processor, cause the processor to perform the method of claim 1.

20. A non-transitory computer-readable storage medium storing instructions that, when executed by a processor, cause the processor to perform the method of claim 10.

* * * * *